US012748308B2

(12) United States Patent
Gao et al.

(10) Patent No.: US 12,748,308 B2
(45) Date of Patent: Sep. 29, 2026

(54) LIQUID CRYSTAL FOR VISION CORRECTION

(71) Applicant: Tencent America LLC, Palo Alto, CA (US)

(72) Inventors: Kun Gao, Dublin, CA (US); Yi Zhang, Palo Alto, CA (US); John D. Le, Palo Alto, CA (US); Youngshik Yoon, Palo Alto, CA (US); Hongdong Li, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 589 days.

(21) Appl. No.: 18/125,560

(22) Filed: Mar. 23, 2023

(65) Prior Publication Data

US 2024/0319503 A1 Sep. 26, 2024

(51) Int. Cl.
*G02B 27/01* (2006.01)
*G02F 1/1335* (2006.01)

(52) U.S. Cl.
CPC ... *G02B 27/0172* (2013.01); *G02F 1/133526* (2013.01); *G02F 1/133562* (2021.01); *G02B 2027/0116* (2013.01)

(58) Field of Classification Search
CPC ........... G02B 27/0172; G02F 1/133562; G02F 1/133526
See application file for complete search history.

(56) References Cited

U.S. PATENT DOCUMENTS

| | | | | |
|---|---|---|---|---|
| 9,551,886 | B2 | 1/2017 | Yang et al. | |
| 9,671,612 | B2 | 6/2017 | Kress et al. | |
| 9,977,259 | B2 | 5/2018 | Archambeau et al. | |
| 10,108,068 | B2 | 10/2018 | Gordon et al. | |
| 10,133,168 | B1 * | 11/2018 | Taylor | G02B 27/0025 |
| 10,459,231 | B2 | 10/2019 | Miller et al. | |
| 10,852,553 | B2 | 12/2020 | Pedder et al. | |
| 10,948,801 | B1 * | 3/2021 | Lu | G02B 27/0172 |

(Continued)

FOREIGN PATENT DOCUMENTS

| | | | | |
|---|---|---|---|---|
| WO | 2020/186123 | A1 | 9/2020 | |
| WO | WO-2020183107 | A2 * | 9/2020 | G02B 27/286 |

OTHER PUBLICATIONS

Invitation to Pay Additional Fees received for PCT Patent Application No. PCT/US2023/074627, mailed on Jan. 25, 2024, 2 pages.

(Continued)

*Primary Examiner* — Lucy P Chien
(74) *Attorney, Agent, or Firm* — ArentFox Schiff LLP

(57) ABSTRACT

Aspects of the disclosure provide an optical system, a head mounted display (HMD) system, and a method of tuning the optical system. The optical system can include one or more liquid crystal (LC) lenses that are refractive optical elements. The one or more liquid crystal lenses can have a first chromatic aberration. The optical system can include a Pancharatnam-Berry (PB) phase lens that is a diffractive optical element. The PB phase lens can have a second chromatic aberration that is complementary to the first chromatic aberration. A chromatic aberration of the optical system can be less than the first chromatic aberration. The HMD system can include a display device, the optical system, and a virtual reality (VR) viewing optical system.

19 Claims, 14 Drawing Sheets

(56) References Cited

U.S. PATENT DOCUMENTS

| | | | | |
|---|---|---|---|---|
| 11,467,370 | B2 | 10/2022 | Lee et al. | |
| 2005/0207003 | A1* | 9/2005 | Kobayashi ........... | G02B 21/025 359/368 |

OTHER PUBLICATIONS

J. F. Algorri, et al., 'Recent Advances in Adaptive Liquid Crystal Lenses', Crystals, 9, 272 (2019), pp. 1-20.

Y. J. Wang, et al., 'Varifocal augmented reality adopting electrically tunable uniaxial plane-parallel plates', Opt. Express, 28, 23023 (2020), pp. 1-15.

K. Yin, et al., 'Advanced liquid crystal devices for augmented reality and virtual reality displays: principles and applications', Light: Science & Applications, 11, 161 (2022), pp. 1-22.

Half dome updates: FRL explores more comfortable, compact VR prototypes for work: Meta quest blog. Meta. (n.d.). Retrieved Mar. 23, 2023, from https://www.meta.com/blog/quest/half-dome-updates-frl-explores-more-comfortable-compact-vr-prototypes-for-work/, pp. 1-7.

K. Bang, et al., 'Lenslet VR: Thin, Flat and Wide-FOV Virtual Reality Display Using Fresnel Lens and Lenslet Array', IEEE Transactions on Visualization and Computer Graphics, 27, 2545 (2021), pp. 1-10.

O. Cakmakci, et al., 'Holographic pancake optics for thin and lightweight optical see-through augmented reality', Opt. Express, 29, 35206 (2021), pp. 1-10.

Y. Y. Kao, et al., 'A new low-voltage-driven GRIN liquid crystal lens with multiple ring electrodes in unequal widths', Opt. Express, 18, 18506 (2010), pp. 1-13.

Spherical vs. parabolic mirror focal regions. Thorlabs, Inc.—Your Source for Fiber Optics, Laser Diodes, Optical Instrumentation and Polarization Measurement Control. (n.d.). Retrieved Mar. 23, 2023, from https://www.thorlabs.com/newgrouppage9.cfm?objectgroup_id=14211, pp. 1-2.

Considerations when using cylinder lenses: Edmund Optics. Edmund Optics Worldwide. (n.d.). Retrieved Mar. 23, 2023, from https://www.edmundoptics.com/knowledge-center/application-notes/lasers/considerations-when-using-cylinder-lenses/, pp. 1-3.

S. Moon, et al., 'Augmented reality near-eye display using pancharatnam-berry phase lenses', Scientific reports, 9, 1 (2019), pp. 1-11.

K. Gao, et al., "Thin-film Pancharatnam lens with low f-number and high quality," Opt. Express 23, 26086 (2015), pp. 1-9.

K. Gao, et al., "High efficiency large-angle Pancharatnam phase deflector based on dual-twist design," Opt. Express 25, 6283 (2017), pp. 1-9.

T. Zhan, et al., 'Practical Chromatic Aberration Correction in Virtual Reality Displays Enabled by Cost-Effective Ultra-Broadband Liquid Crystal Polymer Lenses', Adv. Optical Mater., 8, 1901360 (2020), pp. 1-5.

J. Nagar, el al., 'Apochromatic singlets enabled by metasurface-augmented GRIN lenses', Optica, 5, 99 (2018), pp. 1-4.

Amit K. Bhowmick, Afsoon Jamali, Douglas Bryant, Sandro Pintz, and Philip J. Bos Dynamic correction of astigmatism, vol. 62, No. 7 / Mar. 1, 2023 /Applied Optics 1791, pp. 1-14.

* cited by examiner

Combination of the LC Lenses and the PB phase Lens for varifocal operation

| | | | | | | | | | | | | | | |
|---|---|---|---|---|---|---|---|---|---|---|---|---|---|---|
| LC Lenses Optical Power (D) | 3 | 2 | 1 | 0 | -1 | -2 | -3 | 3 | 2 | 1 | 0 | -1 | -2 | -3 |
| PB Phase Lens Optical Power (D) | 3 | 3 | 3 | 3 | 3 | 3 | 3 | -3 | -3 | -3 | -3 | -3 | -3 | -3 |
| **Total Optical Power (D)** | **6** | **5** | **4** | **3** | **2** | **1** | **0** | **0** | **-1** | **-2** | **-3** | **-4** | **-5** | **-6** |

*FIG. 9*

LIQUID CRYSTAL FOR VISION CORRECTION

TECHNICAL FIELD

The present disclosure includes embodiments related to display technology, such as near eye display technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near eye display (NED) devices are being developed to provide an improved user experience in fields such as augmented reality (AR) and virtual reality (VR). The NED devices can include various wearable devices, such as a head mounted display (HMD) device, smart glasses, and the like. In an example, an HMD device includes a relatively small display device and optics that can create a virtual image in the field of view of one or both eyes. To the eye, the virtual image appears at a distance and appears much larger than the relatively small display device.

SUMMARY

Aspects of the disclosure provide an optical system. The optical system can include one or more liquid crystal (LC) lenses that are refractive optical elements. The one or more liquid crystal lenses can have a first chromatic aberration. The optical system can include a Pancharatnam-Berry (PB) phase lens that is a diffractive optical element. The PB phase lens can have a second chromatic aberration that is complementary to the first chromatic aberration. A chromatic aberration of the optical system can be less than the first chromatic aberration.

In an embodiment, a first optical power of the one or more LC lenses is electrically tunable, an optical power of the optical system is based at least on a sum of the first optical power of the one or more LC lenses and a second optical power of the PB phase lens, and the first optical power, the second optical power, and the optical power of the optical system correspond to respective focal lengths of the one or more LC lenses, the PB phase lens, and the optical system.

In an example, the one or more LC lenses include a plurality of LC lenses, each of the LC lenses is electrically tunable, and the first optical power is a sum of respective optical powers of the plurality of LC lenses. In an example, a number of the plurality of LC lenses is 3.

In an embodiment, one of the one or more LC lenses includes a plurality of transparent ring electrodes disposed on a first substrate and a transparent electrode disposed on a second substrate. The first substrate and the second substrate can be parallel to a plane. A refractive index of the one of the one or more LC lenses varies with a radial distance from a center of the plurality of transparent ring electrodes on the first substrate. The refractive index can be controlled by respective voltages of the plurality of transparent ring electrodes. The refractive index and the first optical power can be circularly symmetric in the plane.

In an embodiment, the PB phase lens includes a center grating and a plurality of ring gratings formed by a liquid crystal material over a substrate, each of the plurality of ring gratings surrounds the center grating, the PB phase lens is configured to generate an output light beam from an input light beam that is incident onto the substrate perpendicularly, and a center diffracted portion of the output light beam has first diffraction angle θ1. The center diffracted portion corresponds to a center portion of the input light beam that is incident onto the center grating. Peripheral diffracted portions of the output light beam have diffraction angles varying from the first diffraction angle θ1 to a second diffraction angle θ2 corresponding to an outermost ring grating in the plurality of ring gratings. The peripherical diffracted portions correspond to peripheral portions of the input light beam that are incident onto the plurality of ring gratings, respectively. The second diffraction angle θ2 can be greater than the first diffraction angle θ1.

In an example, the PB phase lens functions as a converging lens based on a first polarization state of the input light beam. In an example, the PB phase lens functions as a diverging lens based on a second polarization state of the input light beam.

In an example, the input light beam is left circularly polarized, the output light beam is right circularly polarized, and the PB phase lens functions as the converging lens with the second optical power being positive.

In an example, the input light beam is right circularly polarized, the output light beam is left circularly polarized, and the PB phase lens functions as the diverging lens with the second optical power being negative.

In an example, the optical system includes one or more cylindrical LC lenses configured to correct for astigmatism of an eye of a user using the optical system. For each of the one or more cylindrical LC lenses, the respective cylindrical LC lens includes a plurality of transparent electrodes disposed on a first substrate and a transparent electrode disposed on a second substrate. The first substrate and the second substrate can be parallel to an XZ plane including an X axis and a Z axis that are perpendicular to each other. The plurality of transparent electrodes can be parallel. A refractive index that is electrically tunable varies along a respective first dimension in the XZ plane.

In an example, the one or more cylindrical LC lenses include a first cylindrical LC lens, a second cylindrical LC lens, and a third cylindrical LC lens with the first dimensions forming 0, 45°, and 90° with the X axis, respectively.

In an example, the optical system includes a LC spatial light modulator (SLM) that is configured to manipulate a polarization state of an input light beam to the LC SLM by varying a voltage input to the LC SLM. An output light beam from the LC SLM can be the input light beam to the PB phase lens. The LC SLM being electrically tunable.

In an example, the one or more LC lenses include a stack of LC lenses that are electrically tunable. The one or more cylindrical LC lenses include a stack of cylindrical LC lenses with the first dimensions forming different angles with the X axis, respectively. The stack of cylindrical LC lenses can be electrically tunable. An electrically tunable lens system includes the stack of LC lenses and the stack of cylindrical LC lenses. The LC SLM is disposed between the electrically tunable lens system and the PB phase lens.

In an example, an input light beam that is incident onto the electrically tunable lens system is linearly polarized, and an output light beam from the electrically tunable lens system incident onto the LC SLM is linearly polarized. If the voltage of the LC SLM is a first voltage, the LC SLM is configured to convert the linearly polarized input light beam to the LC SLM to a left circularly polarized output light beam from the LC SLM, and the PB phase lens is configured to convert the left circularly polarized input light beam to the PB phase lens to a right circularly polarized output light beam from the PB phase lens. If the voltage of the SLM is a second voltage, the LC SLM is configured to convert the linearly polarized input light beam to the LC SLM to a right circularly polarized output light beam from the LC SLM, and the PB phase lens is configured to convert the right circularly polarized input light beam to the PB phase lens to a left circularly polarized output light beam from the PB phase lens.

Aspects of the disclosure provide a head mounted display (HMD) system. The HMD system can include a display device and an optical system. A pixel array in the display device can be configured to generate light beams. The optical system can include one or more liquid crystal (LC) lenses that are refractive optical elements and a Pancharatnam-Berry (PB) phase lens that is a diffractive optical element. The one or more liquid crystal lenses can have a first chromatic aberration. The PB phase lens can have a second chromatic aberration that is complementary to the first chromatic aberration. A chromatic aberration of the optical system is less than the first chromatic aberration.

In an embodiment, the HMD system includes a virtual reality (VR) viewing optical system disposed between the display device and the optical system.

In an embodiment, the HMD system includes an augmented reality (AR) viewing optical system disposed between the display device and the optical system. The AR viewing optical system can direct the light beams from the display device and light beams from a real object to the optical system Aspects of the disclosure provide a method of tuning an optical system. The method includes obtaining vision correction information for at least one of nearsightedness or farsightedness. The method includes determining a respective optical power of each liquid crystal (LC) lens in a stack of LC lenses and an optical power of a Pancharatnam-Berry (PB) phase lens based on the vision correction information. The method includes determining respective voltages to be applied to the stack of LC lenses based on the respective optical powers of the LC lenses and determining a polarization state of light incident onto the PB phase lens based on the optical power of the PB phase lens. The method includes applying the determined respective voltages to the stack of LC lenses and controlling the polarization state of light incident onto the PB phase lens to correct for the at least one of the nearsightedness or the farsightedness.

In an example, the method includes adjusting at least one of the respective voltages applied to the stack of LC lenses incrementally.

BRIEF DESCRIPTION OF THE DRAWINGS

Further features, the nature, and various advantages of the disclosed subject matter will be more apparent from the following detailed description and the accompanying drawings in which:

FIG. 9 shows examples of a total optical power of one or more LC lenses and the PB phase lens according to an embodiment of the disclosure.

DETAILED DESCRIPTION OF EMBODIMENTS

Eye characteristics, such as visual acuity (or sharpness of vision), can vary greatly among users of a display system. When the display system (e.g., a head mounted display (HMD) system) is used by various users or a user with changing or different eye conditions (e.g., myopia, hyperopia, and/or astigmatism), certain user(s) may not see images on the display clearly without vision correction. In some cases, the vision correction may be performed by the display system.

According to an embodiment of the disclosure, the display system can include a liquid crystal (LC) optical system that is configured to adjust an optical power of the LC optical system, and thus varying a focal length of the LC optical system. The LC optical system can include one or more LC lenses. The one or more LC lenses may be electrically tuned and/or polarization controlled in some embodiments. The LC optical system may be configured as a diverging lens to correct for myopia (i.e., nearsightedness) or a converging lens to correct for hyperopia (i.e., farsightedness) with a variable optical power. The LC optical system can include one or more cylindrical LC lenses that are electrically tuned to correct for astigmatism. In some embodiments, refractive optical elements (ROEs) (e.g., the one or more LC lenses) and a diffractive optical element (DOE) (e.g., a Pancharatnam-Berry (PB) Phase lens) in the LC optical system can be electrically tuned and/or polarization controlled to correct for a chromatic aberration. The LC optical system may be referred to as an LC vision correction optical system.

An optical power can indicate a degree to which an optical system or an optical component (e.g., a lens) converges or diverges light. In an example, the optical power of the optical component or system is equal to a reciprocal of a focal length of the optical component or system. A higher optical power indicates (i) a stronger focusing power for a converging optical component/system or (ii) a stronger diverging power for a diverging optical component/system.

In an example, to allow users to enjoy augmented reality (AR), virtual reality (VR), a mixed reality (MR), a hybrid reality, or some combination and/or derivatives thereof without prescription glasses, the LC optical system can adjust an optical power of the LC optical system (e.g., by adjusting optical powers of respective LC lenses) to match different prescriptions to achieve focus accommodation or dynamic focus.

Figure 1A:
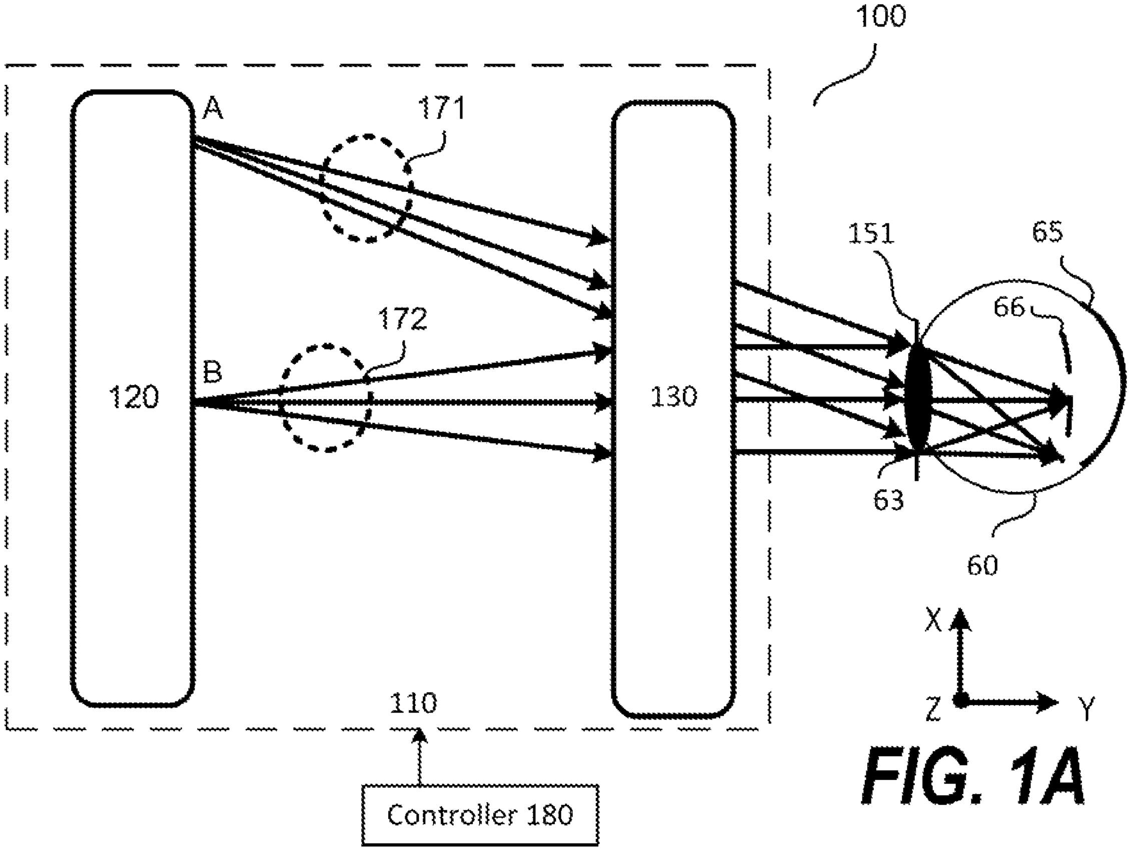
FIG. 1A shows a display system in a side view according to some embodiments of the disclosure.

FIG. 1A shows a display system (e.g., a near eye display system) (100) in a side view according to some embodiments of the disclosure. The display system (100) includes an optical system (110) and a controller (180). The controller (180) is coupled to the optical system (110) to control the operations of the optical system (110). The optical system (110) can include a display device (120) and a viewing optical system (e.g., a virtual reality (VR) viewing optical system) (130). The display device (120) can include a pixel array configured to emit light beams and display images. The viewing optical system (130) can direct the emitted light beams from the display device (120) to an area (151). In an example, the area (151) is located in an XZ plane, and is referred to as an exit pupil of the optical system (110). The XZ plane includes an X axis and a Z axis that is orthogonal to the X axis. A light receiver or detector, such as an eye of a user or the like, can be located at the area (151). Referring to FIG. 1A, the optical system (110) can be configured to be positioned within a distance threshold (e.g., 35 mm) of an eye of a user (e.g., the eye (60)), and the display system (100) can be referred to as a near eye display (NED) system. For example, the display system (100) is a head mounted display (HMD) system worn by a user.

In various examples, the display system (100) can be used by different users with different eye characteristics or conditions, such as different eye prescription (or vision correction) information. In an example (not shown in FIG. 1A), a lens in a first eye forms a clear image on a retina of the first eye, and thus the first eye sees an image displayed on the display device (120) clearly. In an example shown in FIG. 1A, a lens (63) in a second eye (e.g., the eye (60)) forms an image not on a retina (65) of the eye (60), and thus the eye (60) does not see an image displayed on the display device (120) clearly. For example, in FIG. 1A, the lens (63) in the eye (60) forms an image on a surface (66) in front of the retina (65) of the eye (60) when the eye (60) is nearsighted.

Various components in an eye, such as a cornea, a lens, and the like, can manipulate light into the eye to form an image. For purposes of brevity, an image formation function of the various components is represented by a lens (e.g., the lens (63)) of the eye.

Figure 1B:
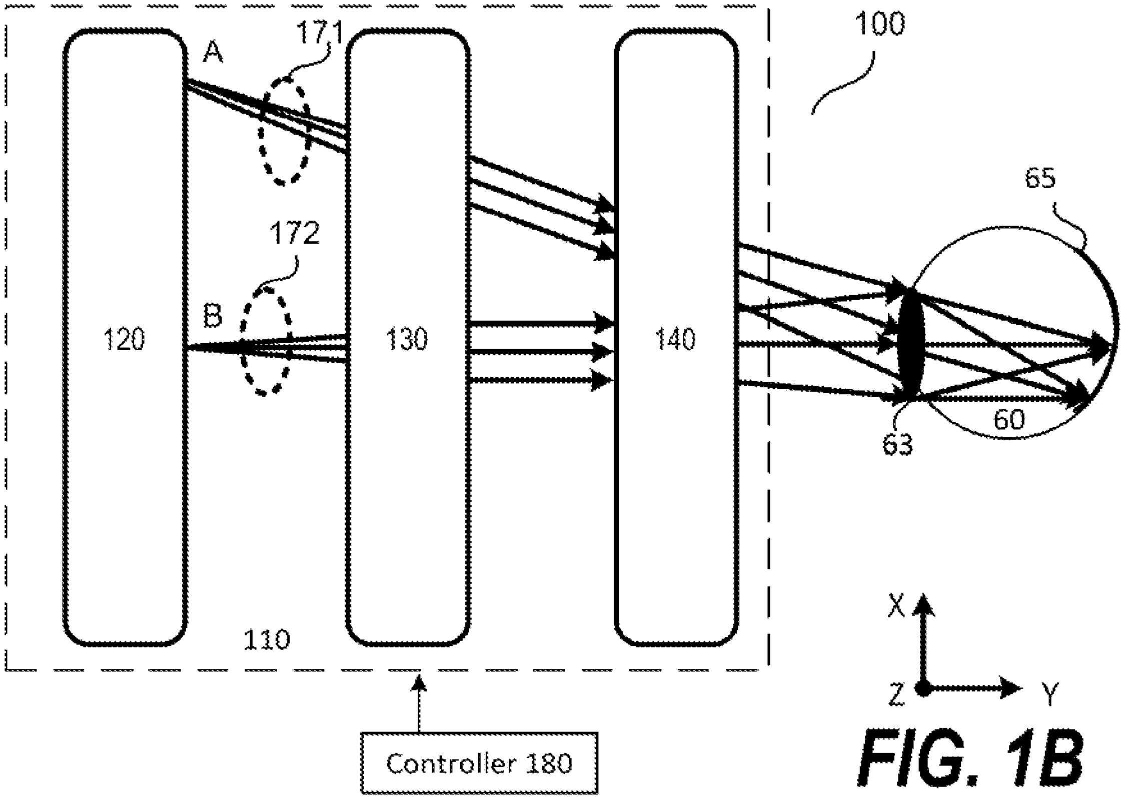
FIGS. 1B-1C show a display system that includes a vision correction optical system in a side view according to some embodiments of the disclosure.

According to an embodiment of the disclosure, referring to FIG. 1B, in order to adapt the display system (100) to different eye characteristics or conditions and to form images on retina(s) of one or more eyes with the different eye characteristics or conditions, the optical system (110) can include a vision correction optical system (140). In an embodiment, the vision correction optical system (140) is tunable (e.g., dynamically adjusted). Further, the vision correction optical system (140) may have a small thickness that is suitable for a NED system. Referring to FIG. 1B, the vision correction optical system (140) can be based on LC material(s), and thus can be referred to as the LC vision correction optical system (140).

In an embodiment, in FIG. 1A, light rays (171) emitted from a pixel A on the display device (120) become collimated (e.g., parallel to each other) after passing through the VR viewing optical system (130). If the eye (60) is nearsighted, the collimated light rays (171) may be focused onto the surface (66) in front of the retina (65), and thus the eye (60) cannot see the pixel A clearly. Similarly, light rays (172) emitted from a pixel B on the display device (120) become collimated after passing through the VR viewing optical system (130). The collimated light rays (172) can be focused onto the surface (66) in front of the retina (65), and thus the eye (60) cannot see the pixel B clearly. Accordingly, the eye (60) cannot see clearly an image on the display device (120).

In FIG. 1B, the collimated light rays (171) from the VR viewing optical system (130) are incident onto the LC vision correction optical system (140). The LC vision correction optical system (140) can be electrically tuned as a diverging lens. Thus, the light rays (171) coming out of the LC vision correction optical system (140) diverges and can be focused onto the retina (65). Thus, the eye (60) that is nearsighted can see the pixel A clearly. Similarly, the light rays (172) coming out of the LC vision correction optical system (140) diverges and can be focused onto the retina (65). Accordingly, the eye (60) can see clearly an image on the display device (120).

In an example, a circularly polarized light incident onto the VR viewing optical system (130) is converted to a linearly polarized light by the VR viewing optical system (130). The linearly polarized light from the VR viewing optical system (130) can be incident onto the LC vision correction optical system (140) that converts the linearly polarized light into a circularly polarized light, which can be incident onto the eye (60). In an example, the display device (120) is an organic light emitting diode (OLED) based display device. Output light from the OLED based display device is circularly polarized, and can be incident onto the VR viewing optical system (130).

The LC vision correction optical system (140) and the VR viewing optical system (130) can be arranged differently than that shown in FIG. 1B. In another example (not shown in FIG. 1B), the LC vision correction optical system (140) is disposed between the display device (120) and the VR viewing optical system (130). In an example, the display device (120) (e.g., an LCD panel) generates linearly polarized light that is incident onto the LC vision correction optical system (140). The LC vision correction optical system (140) can convert the linearly polarized light into circularly polarized light that is incident onto the VR viewing optical system (130). The VR viewing optical system (130) can convert the circularly polarized light into linearly polarized light that is incident onto the eye (60).

In an example, positions of the LC vision correction optical system (140) and the VR viewing optical system (130) in the optical system (110) depends on a polarization state of output light from the display device (120). If the output light from the display device (120) is linearly polarized, the LC vision correction optical system (140) is disposed between the display device (120) and the VR viewing optical system (130) (not shown in FIG. 1B). If the output light from the display device (120) is circularly polarized, the VR viewing optical system (130) is disposed between the display device (120) and the LC vision correction optical system (140), such as shown in FIG. 1B.

In an example not shown in FIG. 1A, an eye is farsighted, and the collimated light rays (171) from the VR viewing optical system (130) can be focused onto a surface behind a retina of an eye, and thus the eye cannot see clearly the pixel A. Referring to FIG. 1B, the collimated light rays (171) from the VR viewing optical system (130) are incident onto the LC vision correction optical system (140). In an example not shown in FIG. 1B, the LC vision correction optical system (140) can be electrically tuned as a converging lens. Thus, the light rays (171) from of the LC vision correction optical system (140) can converge and can be focused onto the retina. Thus, the eye that is farsighted can see the pixel A clearly.

The LC vision correction optical system (140) can be configured to adjust an optical power of the LC vision correction optical system (140), and thus varying a focal length of the LC vision correction optical system (140). Accordingly, an optical power and a focal length of the optical system (110) can be adjusted. The LC vision correction optical system (140) or the optical system (110) can be referred to as a varifocal system. The LC vision correction optical system (140) can be configured (e.g., electrically tuned and/or polarization controlled) as a diverging lens to correct for nearsightedness or as a converging lens to correct for farsightedness with a variable optical power. The LC vision correction optical system (140) can be configured (e.g., electrically tuned) to correct for astigmatism. In some embodiments, the LC vision correction optical system (140) can be configured to correct for a chromatic aberration, for example, by electrically tuning and/or controlling a polarization of light.

Figure 1C:
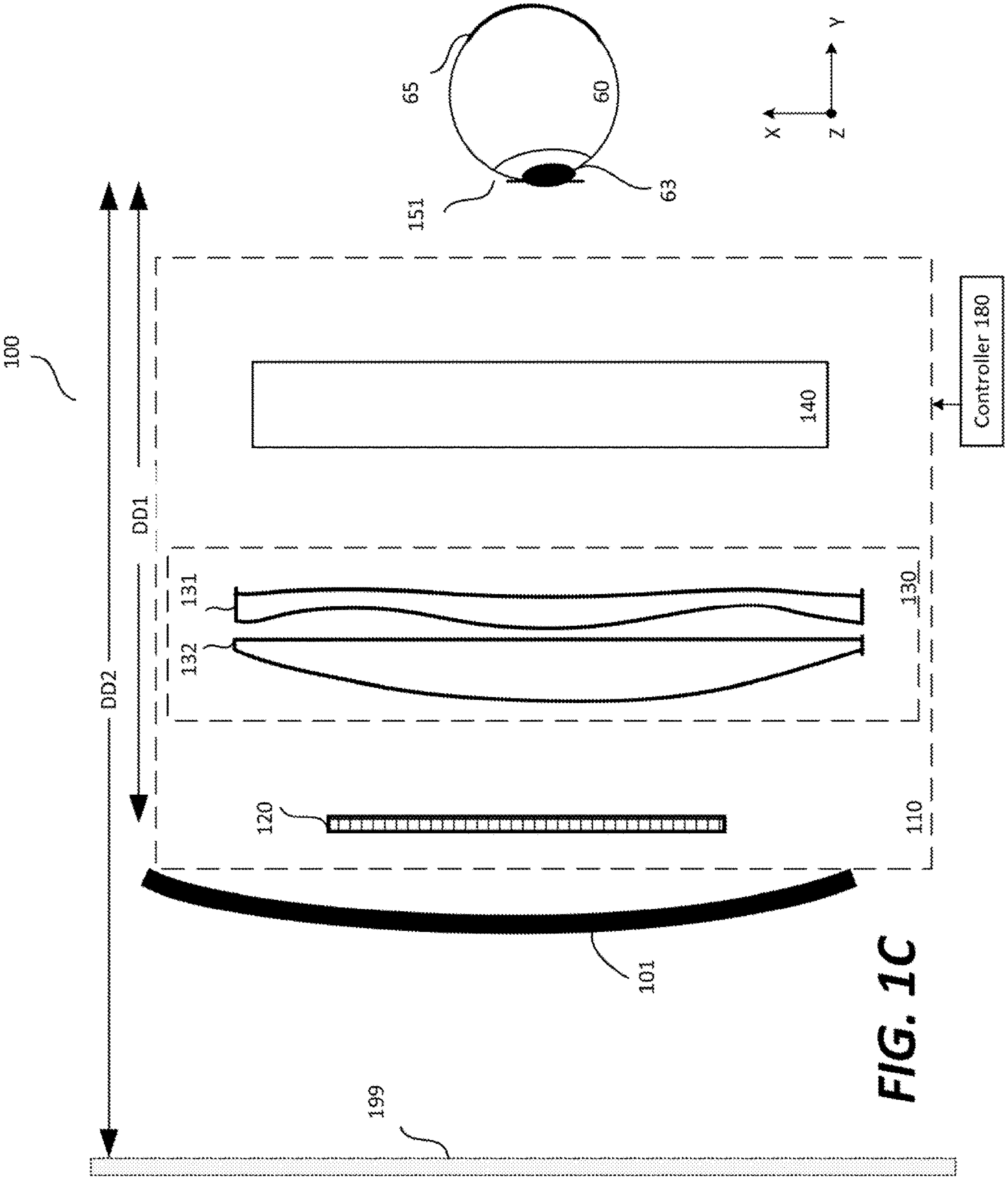

FIG. 1C shows an example of the display system (100) corresponding to the display system (100) in FIG. 1B. The display system (100) in FIG. 1C can include the display device (120) and the LC vision correction optical system (140) described above with respect to FIG. 1B. The VR viewing optical system (130) can be configured to modify the light beams generated by the display device (120), and to direct the modified light beams to the area (151). In some embodiments, the VR viewing optical system (130) can include diffractive elements (e.g., gratings and prisms), refractive elements (e.g., lenses), guiding elements (e.g., planar waveguides and/or fibers), and polarizing elements (e.g., polarizers, half-wave plates, quarter-wave plates, polarization rotators, a PB phase lens, and the like). In the example shown in FIG. 1C, the VR viewing optical system (130) includes ROEs such as a first lens (131) and a second lens (132). Each of the first lens (131) and the second lens (132) can have any suitable thicknesses and/or shapes (e.g., spheric shapes, aspheric shapes, and/or the like).

In the example shown in FIG. 1C, the lens (63) in the eye (60) forms an image on the retina (65) of the eye (60), and thus the eye (60) perceives an image on the display device (120) as a virtual image, such as a virtual image (199). The virtual image (199) appears at a distance DD2 from the area (151) (e.g., the eye (60)) and appears larger than the image on the display device (120). The distance DD2 is larger than a distance DD1 between the area (151) and the display device (120).

The display system (100) can be a component in a suitable artificial reality system. The artificial reality system can adjust reality in some manner into artificial reality and then present the artificial reality to a user. The artificial reality can include, e.g., a VR, an augmented reality (AR), a mixed reality (MR), a hybrid reality, or some combination and/or derivatives thereof. Artificial reality content may include completely generated content or generated content combined with captured (e.g., real objects in a real world) content. The artificial reality content may include video, audio, haptic feedback, or some combination thereof, and any of which can be presented in a single channel or in multiple channels (such as stereo video that produces a three-dimensional effect to the user). In some examples, the display system (100) can be applied to playback of live or prerecorded video.

In an embodiment, a "near eye" display system can include an optical system (e.g., including one or more optical elements) that is configured to be placed within the distance threshold of an eye of a user when the display system (100) (e.g., an HMD system, or smart glasses) is utilized. Referring to FIG. 1C, the distance DD1 between the display device (120) and the area (151) (e.g., the eye (60)) can be less than or equal to the distance threshold.

The display system (100) can be a NED system implemented in various forms, such as an HMD system, smart glasses, a smart phone, and/or the like. In some examples, the artificial reality system is implemented as a standalone NED system. In some examples, the artificial reality system is implemented as a NED system connected to a host computer system, such as a server device, a console device, and the like.

The display device (120) can include a pixel array. In some examples, the pixel array includes multiple pixels arranged to form a two-dimensional surface. The two-dimensional surface of the display device (120) can be substantially flat or planar, can be curved, or can include a combination of flat and planar panels. The display device (120) can be a display panel. The display device (120) can include any suitable type(s) of display panel(s), such as a liquid crystal display (LCD) panel(s), an organic light emitting diode (OLED) panel(s), and/or the like. A resolution of the display device (120) can be defined according to pixels in the two dimensions or one of the two dimensions of the two-dimensional surface. Each pixel in the pixel array can generate a light beam. Each light beam can include a bundle of light rays in any suitable direction. For example, the pixel A on the display device (120) emits a light beam including a bundle of light rays in suitable directions. The light rays (171) that is a subset of the bundle of light rays can be directed by the VR viewing optical system (130) and the LC vision correction optical system (140) to the area (151).

Figure 1D:
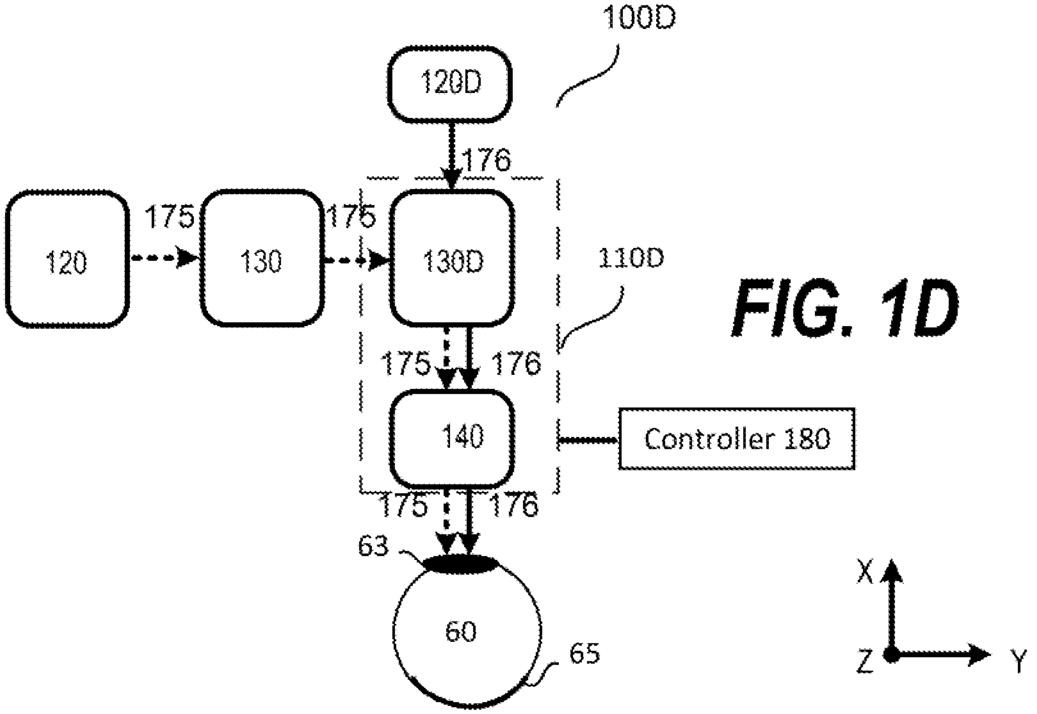
FIGS. 1D-1E show an example where a vision correction optical system is used in an augmented reality (AR) system.

The LC vision correction optical system (140) can be used in any suitable artificial reality system (e.g., a VR system shown in FIGS. 1B-1C, an AR system, a MR system, a hybrid reality system). FIG. 1D shows an example where the LC vision correction optical system (140) is used in an AR system, such as a display system (100D), according to some embodiments of the disclosure. The display system (100D) includes an optical system (110D) and the controller (180). The optical system (110D) can include an AR viewing optical system (e.g., including an AR waveguide) (130D) and the LC vision correction optical system (140). In an example, the optical system (110D) can include the VR viewing optical system (130).

Waveguides can be used in AR and/or MR devices. In NEDs, optical waveguides can bend and combine light to direct the light into an eye and create virtual images seen by a user (e.g., a wearer) overlaid onto an environment.

The AR viewing optical system (130D) can combine light beams (176) (labeled with solid lines) from a real object (120D) (e.g., in a real world) and light beams (175) (labeled with dashed lines) from the display device (120). Referring to FIG. 1D, the light beams (176) are directed by the AR viewing optical system (130D) to the LC vision correction optical system (140). The light beams (175) from the VR viewing optical system (130) are directed (e.g., bent) by the AR viewing optical system (130D) to the LC vision correction optical system (140). The light beams (175) and the light beams (176) can pass through the LC vision correction optical system (140) and can be incident onto an eye, such as the eye (60) described in FIG. 1A. The optical system (110D) can be positioned within the distance threshold of an eye (e.g., the eye (60)), and the display system (100D) can be referred to as a NED system. For example, the display system (100D) is an HMD system worn by a user.

Figure 1E:
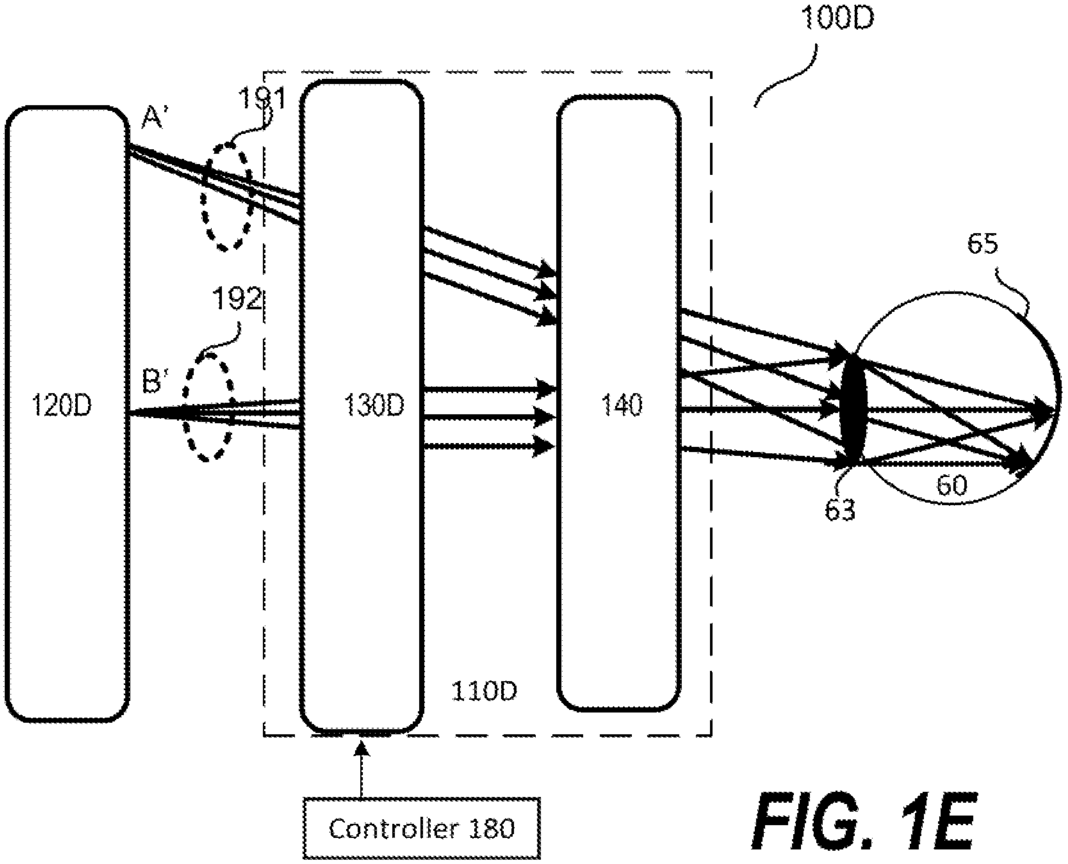

FIG. 1E shows a portion of the display system (100D) in a side view according to some embodiments of the disclosure. As described above, the LC vision correction optical system (140) in the AR system (100D) can be configured to adjust an optical power of the optical system (110D), and thus varying a focal length of the optical system (110D) to correct for nearsightedness or farsightedness of the eye (60). The LC vision correction optical system (140) can be electrically tuned to correct for astigmatism and/or a chromatic aberration.

In an example, two points A' and B' from the real object (120D) emit light rays (191) and (192), respectively. The light rays (191) can become collimated after passing through the AR viewing optical system (130D). The collimated light rays (191) from the AR viewing optical system (130D) are incident onto the LC vision correction optical system (140). The LC vision correction optical system (140) can be electrically tuned as a diverging lens. Thus, the light rays (191) coming out of the LC vision correction optical system (140) diverges and can be focused onto the retina (65). Thus, the eye (60) that is nearsighted can see the point A' clearly. Similarly, the light rays (192) coming out of the LC vision correction optical system (140) diverges and can be focused onto the retina (65). Accordingly, the eye (60) can see clearly the real object (120D).

As both the light beams (175)-(176) pass through the LC vision correction optical system (140), nearsightedness or farsightedness of the eye (60), astigmatism of the eye (60), and/or a chromatic aberration can be corrected for, and the eye (60) can simultaneously see clearly the real object (120D) and the image displayed on the display device (120).

Referring to FIG. 1D, in an example, the AR viewing optical system (130D) and the VR viewing optical system (130) are combined into a viewing optical system. The display system (100D) can include the viewing optical system disposed between the display device (120) and the LC vision correction optical system (140). The viewing optical system can direct the light beams (175) from the display device (120) and the light beams (176) from the real object (120D) to the LC vision correction optical system (140).

LC materials and LC displays (LCDs) have been used widely, for example, in flat screen televisions, mobile phone screens, computer screens, and the like. LC materials can include birefringence materials. LC materials can be electrically controlled by applying a voltage (e.g., a relatively low voltage, such as a few volts (Vs)) to manipulate polarization or a polarization state of light, and manipulating a wavefront of the light to achieve different applications. In various embodiments, LC modulation schemes can include different types including, for example, (i) intensity modulators that modulate an intensity (or light intensity) of light such as used to display information, (ii) polarization modulators used to manipulate and control polarization of light, (iii) phase modulators that manipulate a phase of light such as used in wavefront control, interferometry, DOEs, and the like. Various LC devices can include intensity modulators for intensity modulation (e.g. LCDs, Liquid crystal on silicon (LCoS)) since human eyes are sensitive to changes in light intensity and may be less sensitive to changes in light polarization and phase of light. In an example, human eyes may not notice changes in light polarization and phase of light.

Figure 2:
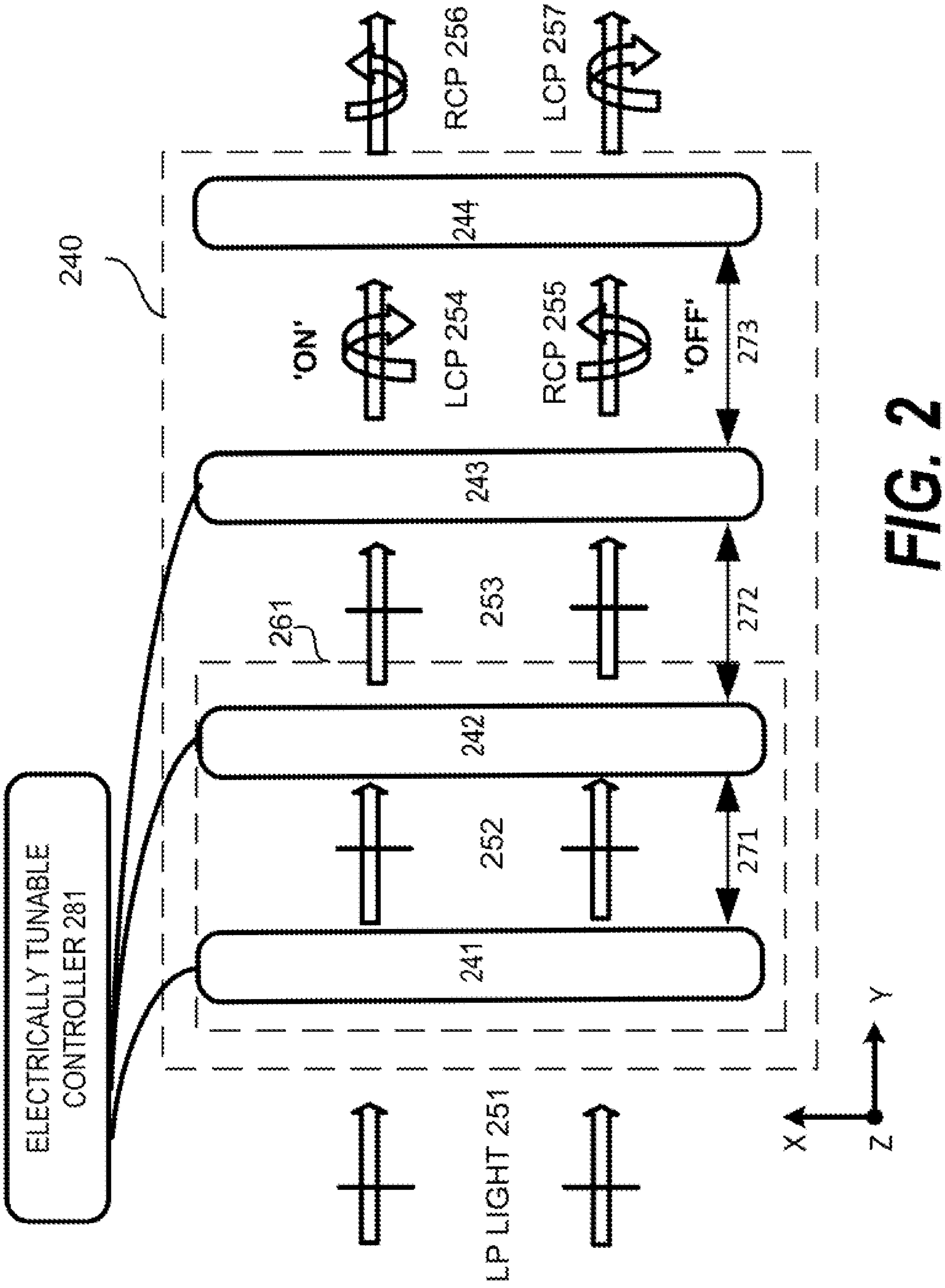
FIG. 2 shows an example of a liquid crystal (LC) vision correction optical system according to an embodiment of the disclosure.

FIG. 2 shows an example of an LC optical system (e.g., an LC vision correction optical system) (240) according to an embodiment of the disclosure. In an example, the LC vision correction optical system (240) is used in the display system (100) or the display system (100D) as the LC vision correction optical system (140).

Prior to describing how the LC vision correction optical system (240) can correct for (i) nearsightedness or farsightedness, (ii) astigmatism, and/or (iii) chromatic aberration, examples of nearsightedness, farsightedness, astigmatism, and chromatic aberration are described as below.

In an embodiment, eye prescription information (or vision correction information) of an eye includes three parameters or three numbers of a lens or a stack of lenses: Sphere (SPH), Cylinder (CYL), and Axis. The parameter "Sphere (SPH)" can indicate an optical power (e.g., in a unit of diopter (D), such as −1D or +2D) of the lens or the lens stack used to correct for nearsightedness (or myopia) or farsightedness (hyperopia) of the eye. The parameter "Sphere (SPH)" can indicate a degree of nearsightedness or farsightedness of the eye. A "plus" (+) sign in front of the number can indicate that the eye is farsighted, and the lens or the lens stack can converge light. A "minus" (−) sign can indicate that the eye is nearsighted, and the lens or the lens stack can diverge light. The further away from zero the number on the eye prescription, the worse the eyesight and the more vision correction (e.g., a stronger prescription) that is required.

In an example, a converging lens used to correct hyperopia is made from a transparent material, such as glass or plastic material(s), and is thicker at a center than at the edges. In an example, a diverging lens used to correct myopia is made from a transparent material, such as glass or plastic material(s), and is thicker at the edges than at the center.

Astigmatism is a type of vision error that can occur, for example, when a cornea or a lens of the eye is irregularly shaped. Astigmatism can cause an image to appear blurry or distorted because light is not focused properly on a retina of the eye. When an eye is evenly rounded (e.g., with a ball shape), no astigmatism occurs. When the eye has an irregular shape (e.g., oval-shaped), astigmatism can occur. In an example, astigmatism is caused by a cornea and/or a lens in the eye that have irregular shape(s) (e.g., oval-shaped). For example, horizontal astigmatism can occur when a width of the eye is larger than a height of the eye, and vertical astigmatism can occur when the width of the eye is less than the height of the eye. With astigmatism, vision can be blurry.

Astigmatism of an eye can be indicated by a degree of the astigmatism and an orientation of the astigmatism. The parameter Cylinder (CYL) can indicate the degree of the astigmatism of the eye and can be a negative or a positive number. The parameter Cylinder (CYL) can measure in diopters the degree of the astigmatism of the eye. A bigger Cylinder (CYL) can indicate more astigmatism. The parameter Axis can be a number between 0° and 180° that can indicate the orientation of the astigmatism.

To correct astigmatism, an eyeglass prescription can specify the optical power (e.g., using the parameter Cylinder (CYL)) of the cylindrical lens, as well as the axis (e.g., using the parameter Axis) at which the cylindrical lens is to be placed. The axis can be measured in degrees, and can indicate a direction in which the cylindrical lens has the greatest power.

Chromatic aberration can indicate a failure of a lens to focus light having polychromatic wavelengths to a same point or a predefined region. Chromatic aberration can include axial (longitudinal) aberration and transverse (lateral) aberration. Axial aberration can occur when different wavelengths of light are focused at different distances from the lens (e.g., a focus shift). Longitudinal aberration can occur at long focal lengths. Transverse aberration can occur when different wavelengths are focused at different positions in the focal plane, for example, when a magnification and/or a distortion of a lens varies with wavelength. Transverse aberration can occur at short focal lengths.

Nearsightedness, farsightedness, astigmatism, and/or chromatic aberration can be corrected for by the LC vision correction optical system (240). Referring to FIG. 2, the LC vision correction optical system (240) can include one or more LC lenses (e.g., a stack of LC lenses) (241), one or more cylindrical LC lenses (e.g., a stack of cylindrical LC lenses) (242), a spatial light modulator (SLM) (e.g., an LC SLM) (243), a PB phase lens (244), and/or the like. In an embodiment, one or more components in the LC vision correction optical system (240) are electrically tunable (or electrically controlled), for example, by an electrically tunable controller (281). In an example, the controller (180) in FIGS. 1A-1D can include the electrically tunable controller (281). For example, the one or more LC lenses (241), the one or more cylindrical LC lenses (242), and the LC SLM (243) are electrically controlled by the electrically tunable controller (281). The PB phase lens (244) can be polarization controlled, for example, whether the PB phase lens (244) acts as a converging lens or a diverging lens is controlled by a polarization of light that is incident onto the PB phase lens (244).

In an embodiment, each of the one or more LC lenses (241), the one or more cylindrical LC lenses (242), the LC SLM (243), and the PB phase lens (244) is flat and thin, and the LC vision correction optical system (240) is flat and thin. The LC vision correction optical system (240) can be an ultra-compact system for vision correction including electrically tunable and/or polarization controlled LC devices (e.g., (241), (242), (243), and/or (244)).

In an example, the LC vision correction optical system (240) is referred to as a non-mechanical system as the LC vision correction optical system (240) is not tuned mechanically. For example, the LC vision correction optical system (240) is tuned using non-mechanical methods, such as tuned electrically or by manipulating a polarization of light. In other embodiments, the LC vision correction optical system (240) may include a combination of electrically and mechanically tuned elements. In other embodiments, the LC vision correction optical system (240) may include non-LC based optical elements, such as a non-LC based lens or lenses.

Optical elements (e.g., (241), (242), (243), and/or (244)) perform different functions in the LC vision correction optical system (240) and are made by LC materials using respective fabrication technologies. A combination of the 'flat' (e.g., thin) optical elements can achieve defocus function (or a varifocal function), correction for astigmatism, correction for chromatic aberration, and/or the like that can occur in virtual and/or augmented reality systems.

Referring to FIG. 2, electrically tunable LC lenses that are adaptive LC phase modulators (e.g., (241) and (242)), a polarization controlled PB phase lens (e.g., (244)) that is a passive LC phase modulator, and a fast-switchable SLM (e.g., (243)) that is an LC polarization modulator can be combined in the LC vision correction optical system (240) for vision correction, for example, in VR and/or AR NED systems. Different functions including defocus (or a varifocal function), astigmatism correction, and/or chromatic aberration correction can be achieved by the LC vision correction optical system (240) using LC technologies. In an example, each of the optical elements (e.g., (241)-(244)) employs LC technologies. The LC vision correction optical system (240) with a varifocal function and a dynamic adjustment of wavefront can equivalently provide spectacle prescription, for example, from −6D to +6 D for different users by only changing applied voltages, and thus reducing eye strain and fatigue from long-time use. The LC vision correction optical system (240) can compensate for chromatic aberration in a majority of a light spectrum of a LCD panel, such as from 430 nanometer (nm) to 680 nm. In an example, a radius of each optical element in the LC vision correction optical system (240) is the same, such as from 15 mm to 30 mm. The LC vision correction optical system (240) can have a lightweight due to a thinner thickness and a lower power consumption.

In a mechanical varifocal system, (i) lens distance(s) may be manually adjusted or (ii) voice coil actuators and flexure hinge arrays may be used. However, mechanical varifocal systems can be bulky for a VR helmet, and may feel heavy on a user's head with extended use. A combination of PB phase lenses and a switchable half wave plate (HWP) where only polarization control may be used in place of a mechanical adjustment in the mechanical varifocal system. The combination of the PB phase lenses and the switchable HWP can shift focus between different depths to achieve a smooth varifocal. However, astigmatism and chromatic aberration in human eyes may not be corrected for by the varifocal system. In embodiments of the LC vision correction optical system (240), the LC vision correction optical system (240) is controlled electrically and/or via polarization control, and is not controlled mechanically. The electrical and/or polarization control can allow the LC vision correction optical system (240) be more lightweight, thin, and fast-switchable. Further, the LC vision correction optical system (240) can be configured to vary a focal length as well as to correct for astigmatism and/or chromatic aberration, and thus providing a more comprehensive vision correction.

According to an embodiment of the disclosure, the LC vision correction optical system (240) can include ROE(s) and DOE(s) that have complementary optical properties. ROE(s) and DOE(s) are described in further detail below.

In an embodiment, a lens refracts light that is incident onto the lens and diverges or converges the light. The lens can be referred to as an ROE as light is refracted by the lens. A focal length of the lens that is an ROE can depend on a refractive index of the lens, and thus a variation of the refractive index can affect focusing.

Chromatic aberration may be caused by dispersion where a refractive index of a lens material varies with wavelengths of light. For example, a refractive index corresponding to blue light is different from a refractive index corresponding to red light. In an example, the focal length of the lens (e.g., an ROE) increases with the wavelength, and chromatic aberration of the lens may be referred to as a first type of chromatic aberration.

When light is incident onto a diffraction grating that is a DOE at an angle $\theta_i$ with respect to an axis that is perpendicular to a surface of the diffraction grating, the light can be diffracted by the diffraction grating at a diffraction angle $\theta_{diff}$ with respect to the axis. In an embodiment, the PB phase lens (244) includes multiple diffraction gratings with different periodicities. A focal length of the PB phase lens (244) can depend on the diffraction angle $\theta_{diff}$. In an embodiment, the focal length of the PB phase lens (244) decreases with the diffraction angle $\theta_{diff}$, and the diffraction angle $\theta_{diff}$ increases with wavelength. Thus, the focal length of the PB phase lens (244) decreases with the wavelength, and chromatic aberration of the PB phase lens (244) may be referred to as a second type of chromatic aberration that can be opposite to the first type of chromatic aberration.

According to an embodiment of the disclosure, including a DOE (e.g., the PB phase lens (244)) with a chromatic aberration that is opposite to a chromatic aberration of an optical system (e.g., the LC vision correction optical system (240) or the optical system (110)) can correct for (e.g., reduce or eliminate) the chromatic aberration of the optical system.

The one or more LC lenses (241) can have a first chromatic aberration. The PB phase lens (244) can having a second chromatic aberration that is complementary to (e.g., opposite to) the first chromatic aberration. A chromatic aberration of the LC vision correction optical system (240) that is based on at least the first chromatic aberration and the second chromatic aberration is less than the first chromatic aberration.

In an embodiment, the one or more LC lenses (241) are ROEs, and the first chromatic aberration is of the first type of chromatic aberration. The PB phase lens (244) is a DOE, and the second chromatic aberration is of the second type of chromatic aberration. The first chromatic aberration is opposite to the second chromatic aberration and can be reduced by including the PB phase lens (244) in the LC vision correction optical system (240).

Referring to FIG. 2, in an embodiment, the one or more LC lenses (241) and the one or more cylindrical LC lenses (242) are ROEs. A third chromatic aberration of the one or more cylindrical LC lenses (242) is of the first type of chromatic aberration. A chromatic aberration of the one or more LC lenses (241) and the one or more cylindrical LC lenses (242) can include the first chromatic aberration and the third chromatic aberration. The chromatic aberration of the one or more LC lenses (241) and the one or more cylindrical LC lenses (242) (e.g., the first type of chromatic aberration) is opposite to the second chromatic aberration, and can be reduced by including the PB phase lens (244) in the LC vision correction optical system (240).

Referring to FIG. 1C, the VR viewing optical system (130) includes the lenses (131)-(132) that are ROEs, and can have a fourth chromatic aberration that is of the first type of chromatic aberration. The chromatic aberration of the VR viewing optical system (130), the one or more LC lenses (241), and the one or more cylindrical LC lenses (242) are of the first type of chromatic aberration, and can be reduced by the second chromatic aberration of the PB phase lens (244).

In an example, the LC SLM (243) does not introduce chromatic aberration, for example, since the LC SLM (243) does not converge or diverge light.

An optical power of the LC vision correction optical system (240) can be tuned, for example, electrically by the electrically tunable controller (281). One or more optical components in the LC vision correction optical system (240) can be tuned to adjust the optical power of the LC vision correction optical system (240). In an example, a first optical power of the one or more LC lenses (241) is electrically tunable. The one or more LC lenses (241) are electrically tuned to adjust the first optical power. An optical power of the LC vision correction optical system (240) can be based at least on a sum of the first optical power of the one or more LC lenses (241) and a second optical power of the PB phase lens (244). In an example, the first optical power is +2D and the second optical power is −3D, and thus the optical power of the LC vision correction optical system (240) is −1D that is a sum of +2D and −3D. The first optical power, the second optical power, and the optical power of the LC vision correction optical system (240) can correspond to respective focal lengths of the one or more LC lenses (241), the PB phase lens (244), and the LC vision correction optical system (240).

In an example, the one or more LC lenses (241) include a plurality of LC lenses. Each of the LC lenses can be electrically tunable, and the first optical power can be a sum of the respective optical powers of the plurality of LC lenses. For example, a number of the plurality of LC lenses is 3.

an embodiment, a light beam is randomly polarized if the light beam includes a rapidly varying succession of different polarization states. A light beam can be polarized, such as linearly polarized (e.g., in a linear polarization state), circularly polarized (e.g., in a circular polarization state), elliptically polarized (e.g., in an elliptical polarization state), or the like. For the linearly polarized light, an electric field vector of the light beam is along a particular line. For the circularly polarized light, an electric field vector of the light beam rotates, e.g., clockwise or counter-clockwise as seen by an observer toward whom the light beam is propagating.

Degree of polarization (DOP) is a quantity that indicates a portion of an electromagnetic wave (e.g., a light beam) that is polarized. A perfectly polarized wave can have a DOP of 100%, and an unpolarized wave can have a DOP of 0%. A partially polarized wave can be represented by a superposition of a polarized component and an unpolarized component, and thus can have a DOP between 0 and 100%. DOP can be calculated as a fraction of a total power that is carried by the polarized component of the wave (e.g., a light beam).

A light beam can have any suitable polarization state(s) and/or DOP. In an example, the light beam is circularly polarized having a DOP of 100%, and the light beam is completely circularly polarized. In an example, the light beam is predominantly circularly polarized having a relatively large DOP that is above a threshold (e.g., 80% or above), such as a superposition of (i) a circularly polarized component and (ii) an unpolarized component and/or another polarization component. A circularly polarized light beam having a DOP of 100% or a predominantly circularly polarized light beam having a relatively large DOP can be referred to as a circularly polarized light beam below. In an example, a light beam is linearly polarized having a DOP of 100% or predominantly linearly polarized having a relatively large DOP that is above a threshold. A linearly polarized light beam having a DOP of 100% or a predominantly linearly polarized light beam having a relatively large DOP can be referred to as a linearly polarized light beam below.

In an embodiment, the PB phase lens (244) functions as a converging lens or a diverging lens based on a polarization state of an input light beam (e.g., (254) or (255)) to the PB phase lens (244). The second optical power of the PB phase lens (244) can be polarization controlled, for example, by controlling or manipulating the polarization state of the input light beam to the PB phase lens (244).

Referring to FIG. 2, when the input light beam (254) to the PB phase lens (244) is left circularly polarized (LCP), an output light beam (256) from the PB phase lens (244) is right circularly polarized (RCP), and the PB phase lens (244) can function as the converging lens with the second optical power (e.g., +3D) being positive. When the input light beam (255) to the PB phase lens (244) is right circularly polarized, the output light beam (257) from the PB phase lens (244) is left circularly polarized, and the PB phase lens (244) can function as the diverging lens with the second optical power (e.g., −3D) being negative. In an example, a magnitude of the second optical power (e.g., 3D) remains constant when the polarization state (e.g., LCP or RCP) of the input light beam to the PB phase lens (244) changes.

Referring to FIG. 2, the LC SLM (243) can be electrically tunable. The LC SLM (243) can be configured to manipulate a polarization state of a light beam (253) passing through the LC SLM (243) by varying a voltage to the LC SLM (243) via the electrically tunable controller (281).

In an example, when the voltage to the LC SLM (243) is a first voltage (e.g., 6V corresponding to an "ON" state of the LC SLM (243)), the LC SLM (243) can convert the light beam (253) that is linearly polarized to the LCP light beam (254). Subsequently, the PB phase lens (244) can be configured to convert the LCP light beam (254) incident onto the PB phase lens (244) to the RCP light beam (256) exiting the PB phase lens (244). In an example, when the voltage to the LC SLM (243) is a second voltage (e.g., 0V corresponding to an "OFF" state of the LC SLM (243)), the LC SLM (243) can convert the light beam (253) that is linearly polarized to the RCP light beam (255). Subsequently, the PB phase lens (244) can be configured to convert the RCP light beam (255) incident onto the PB phase lens (244) to the LCP light beam (257) exiting the PB phase lens (244). Thus, the polarization state of the light beam (e.g., (254) or (255)) into the PB phase lens (244) can be controlled electrically by controlling the LC SLM (243). Since the sign (e.g., "+" or "−") of the second optical power is controlled by the polarization state of the light beam (e.g., (254) or (255)) into the PB phase lens (244), the sign (e.g., "+" or "−") of the second optical power can be indirectly controlled electrically.

The one or more cylindrical LC lenses (242) can be configured to correct for astigmatism. The one or more cylindrical LC lenses (242) can include a stack of multiple cylindrical LC lenses with cylindrical axes (e.g., in the XZ plane) forming different angles with an axis (e.g., the X axis) in the XZ plane, respectively. The stack of multiple cylindrical LC lenses can be electrically tunable via the electrically tunable controller (281).

Referring to FIG. 2, the one or more LC lenses (241) can include a stack of multiple LC lenses that are electrically tunable, and the one or more cylindrical LC lenses (242) can include the stack of multiple cylindrical LC lenses. An electrically tunable lens system (261) can include the stack of LC lenses (241) and the stack of cylindrical LC lenses (242). In an example, the stack of LC lenses (241) and the stack of cylindrical LC lenses (242) are separated by a gap (271). In an example, the stack of LC lenses (241) and the stack of cylindrical LC lenses (242) are stacked together with the gap (271) being 0. The LC SLM (243) can be disposed between the electrically tunable lens system (261) and the PB phase lens (244). In an example, the LC SLM (243) is separated from the electrically tunable lens system (261) and the PB phase lens (244) by gaps (272) and (273), respectively. In an example, the electrically tunable lens system (261), the LC SLM (243), and the PB phase lens (244) are stacked together with the gaps (272) and (273) being 0.

In an embodiment, a light beam (e.g., an input light beam) (251) that is incident onto the electrically tunable lens system (261) is linearly polarized (LP). For example, the light beam (251) is an output light beam from the VR viewing optical system (130). The electrically tunable lens system (261) can convert the light beam (251) into the light beam (253) that is an output light beam from the electrically tunable lens system (261) incident onto the LC SLM (243). The light beam (253) is linearly polarized. As described above, when the voltage of the LC SLM (243) is the first voltage (e.g., the "ON" state), the LC SLM (243) can convert the linearly polarized light beam (253) to the LCP light beam (254), and the PB phase lens (244) can convert the LCP light beam (254) to the RCP light beam (256). When the voltage of the LC SLM (243) is the second voltage (e.g., the "OFF" state), the LC SLM (243) can convert the linearly polarized light beam (253) to the RCP light beam (255), and the PB phase lens (244) can convert the RCP light beam (255) to the LCP light beam (257). In an example, the RCP light beam (256) or the LCP light beam (257) is incident onto the eye (60).

Positions of certain components in the LC vision correction optical system (240) can be interchangeable. In an example, positions of the stack of LC lenses (241) and the stack of cylindrical LC lenses (242) are interchangeable. In an example shown in FIG. 2, the light beam (251) is incident onto the stack of LC lenses (241), and the stack of LC lenses (241) converts the light beam (251) into a light beam (252) that is linearly polarized. Subsequently, the light beam (252) is incident onto the stack of cylindrical LC lenses (242), and the stack of cylindrical LC lenses (242) converts the light beam (252) into the light beam (253). In an example, polarization states of the respective light beams (251)-(253) are identical, such as a linear polarization state along an axis in the XZ plane (e.g., the X axis shown in FIG. 2).

In another example, the light beam (251) is incident onto the stack of cylindrical LC lenses (242), and the stack of cylindrical LC lenses (242) converts the light beam (251) into another light beam. Subsequently, the other light beam is incident onto the stack of LC lenses (241), and the stack of LC lenses (241) converts the other light beam into the light beam (253). In an example, a polarization state of the other light beam is identical to that of the light beams (251)-(253), such as the linear polarization state along the X axis.

In an example, a first HMD system includes a display device (e.g., the display device (120)), a VR viewing optical system (e.g., the VR viewing optical system (130)), and the LC vision correction optical system (240). Light beams from the display device can be directed to an eye by the VR viewing optical system and the LC vision correction optical system (240). The LC vision correction optical system (240) is configured to at least one of (i) correct for astigmatism of the eye or (ii) vary the optical power of the LC vision correction optical system (240). By varying the optical power of the LC vision correction optical system (240), an optical power of the first HMD system can be varied such that nearsightedness or farsightedness of the eye is corrected for, and a clear image can be formed on a retina of the eye based on an image on the display device. In an example, the VR viewing optical system is disposed between the display device and the LC vision correction optical system (240). In an example, the LC vision correction optical system (240) is disposed between the display device and the VR viewing optical system. In an example, the PB phase lens (244) corrects for chromatic aberration of lenses that are ROEs in the first HMD.

In an example, a second HMD system includes an AR viewing optical system (e.g., the AR waveguide (130D)) and the LC vision correction optical system (240). Light beams from a real object can be directed to an eye by the AR viewing optical system and the LC vision correction optical system (240). The LC vision correction optical system (240) is configured to at least one of (i) correct for astigmatism of the eye or (ii) vary the optical power of the LC vision correction optical system (240). By varying the optical power of the LC vision correction optical system (240), an optical power of the second HMD system can be varied such that nearsightedness or farsightedness of the eye is corrected for, and a clear image can be formed on a retina of the eye based on the real object. In an example, a light beam from the AR viewing optical system is incident onto the LC vision correction optical system (240). In an example, a light beam from the LC vision correction optical system (240) is incident onto the AR viewing optical system. In an example, the PB phase lens (244) corrects for chromatic aberration of lenses that are ROEs in the second HMD.

The one or more LC lenses (241) and the one or more cylindrical LC lenses (242) in the LC vision correction optical system (240) may be electrically tunable 'flat' (thin) LC lenses. When the one or more LC lenses (241) and the one or more cylindrical LC lenses (242) are combined with the polarization controlled PB phase lens (244) and a fast-switchable TN LC SLM (243), multiple functions can be realized, for example, a varifocal function can be realized dynamically, astigmatism can be corrected for dynamically, and/or chromatic aberration can be simultaneously corrected for. Users or wearers with myopia and hyperopia no longer need prescription glasses to use VR/AR displays including the LC vision correction optical system (240).

In an example, including the LC vision correction optical system (240) in a NED may increase a resolution of the NED without affecting other parameters of the NED, such as a field of view (FOV).

Figure 3:
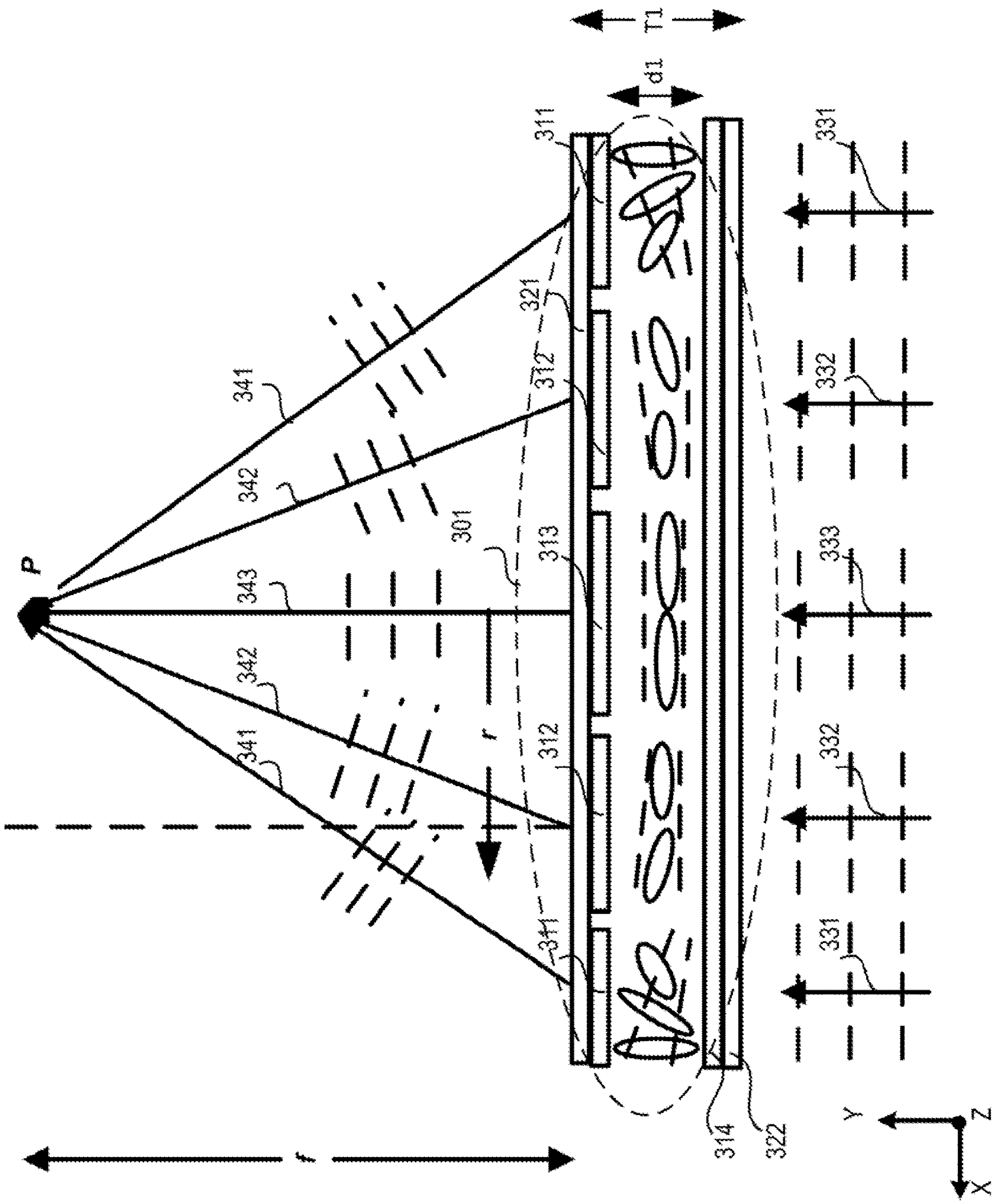
FIG. 3 shows an exemplary LC lens that is electrically tunable according to an embodiment of the disclosure.

FIG. 3 shows an exemplary LC lens (301) that is electrically tunable. In an example, each of the one or more LC lenses (241) is identical or similar to the LC lens (301). The LC lens (301) can be a type of an ROE. The LC lens (301) can be referred to as a gradient refractive index (GRIN) lens since the LC lens (301) is based on a gradual variation of the refractive index without using a curved surface. The LC lens (301) can correct for nearsightedness or farsightedness, for example, as indicated by a parameter "Sphere (SPH)" in a spectacle prescription.

The LC lens (301) can include a plurality of electrodes. For example, the LC lens (301) can include an electrode (e.g., a circular center electrode) (313) and one or more ring electrodes (312)-(313) disposed on a first substrate (321) and an electrode (314) disposed on a second substrate (322). The first substrate (321) and the second substrate (322) can be parallel to each other, for example, to the XZ plane. The first substrate (321), the second substrate (322), and the electrodes (311)-(314) can be transparent. The first substrate (321) and the second substrate (322) can be flat, and thus the LC lens (301) can be flat. A thickness T1 of the LC lens (301) can be relatively small, such as less than or equal to 1 mm. The electrodes (311)-(314) can be controlled by a voltage controller, such as the electrically tunable controller (281).

The LC lens (301) can include a plurality of LC cells. Each LC cell can include a stack of (i) a transparent substrate (e.g., a glass substrate) such as the second substrate (322), (ii) a transparent electrode (e.g., ITO, such as (314)), (iii) an alignment material (e.g., polyimide) to align the LC material, (iv), an LC material (e.g., nematic LC material), (v) a transparent electrode (e.g., ITO, such as (313)), and (vi) a transparent substrate (e.g., (321)). In an example, the nematic LC material does not twist along a light path.

In an embodiment, multiple voltages are applied to the respective electrodes (311)-(313) with reference to a voltage of the electrode (314) (e.g., 0V or another suitable voltage). A first voltage is applied to the electrode (311), a second voltage is applied to the electrode (312), and a third voltage is applied to the electrode (313). In an example, the electrode (311) is at an edge of the LC lens (301), and the first voltage is the largest of the multiple voltages, such as 6V. The electrode (313) is at a center of the LC lens (301), and the third voltage is the smallest of the multiple voltages, such as 0V. In an example (not shown), no electrode is formed at the center of the LC lens (301), and thus the third voltage can be 0V.

When the multiple voltages are applied to the electrodes (311)-(313), respectively, the LC materials (indicated by ovals in FIG. 3) between the respective electrodes (311)-(313) and the electrode (314) can be manipulated differently. For example, orientations of respective directors of the LC materials change in different apertures (e.g., corresponding to the electrodes (311)-(313)) of the LC lens (301), Thus, refractive indices, such as a first refractive index n1, a second refractive index n2, and a third refractive index n3 corresponding to the respective electrodes (311)-(313), can be different. In an example, the LC materials are birefringent and have two refractive indices $n_e$ and $n_o$ for extraordinary and ordinary light rays, respectively. The first refractive index n1 at the edge (e.g., corresponding to (311)) of the LC lens (301) can be the smallest (e.g., $n_o$), and the third refractive index n3 at the center (e.g., corresponding to (313)) of the LC lens (301) can be the largest (e.g., $n_e$).

FIG. 3 shows an example having two ring electrodes (312)-(313). However, a number of the one or more ring electrodes can be any positive integer, such as 1, 2, or larger than 2.

Figure 4:
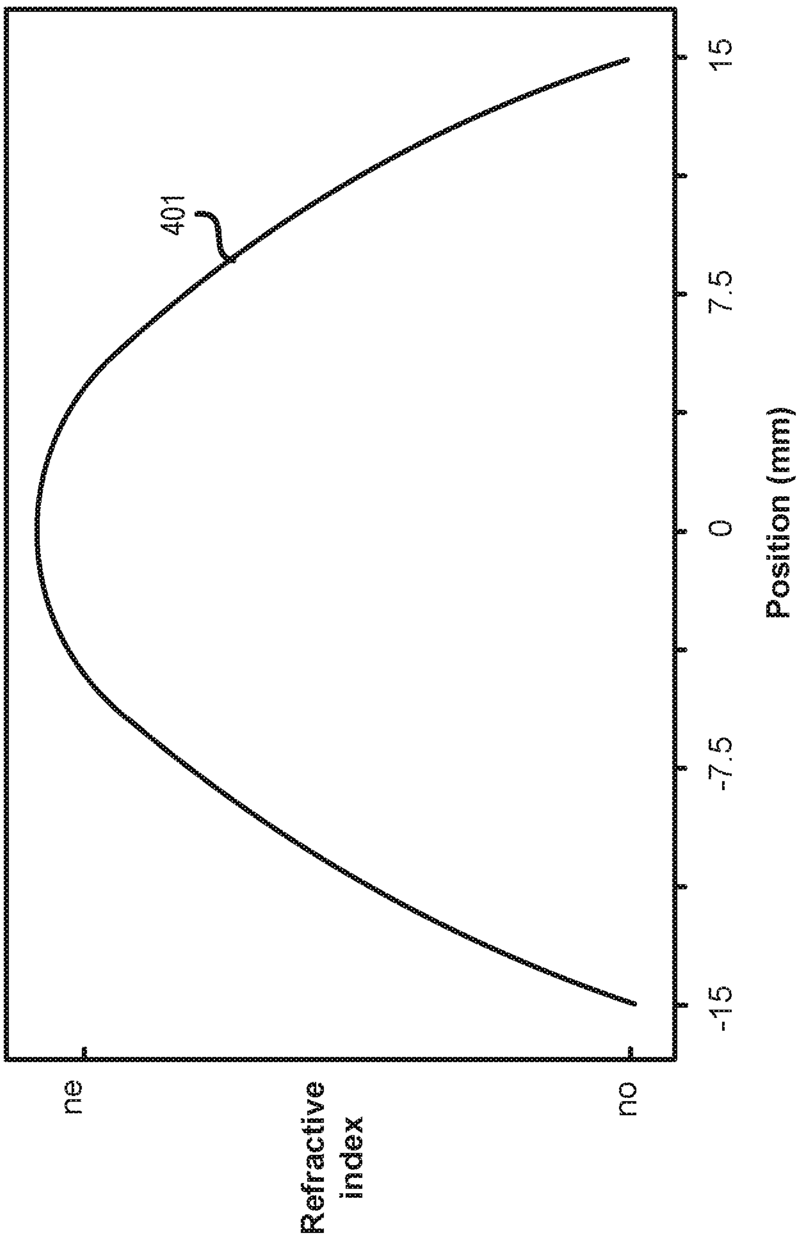
FIG. 4 shows a refractive index of an LC lens versus a position on a first substrate of the LC lens according to an embodiment of the disclosure.

FIG. 4 shows a refractive index of the LC lens (301) versus a position on the first substrate (321). A position of 0 mm is at a center of the first substrate (321). When the number of the one or more ring electrodes is a relatively large number, a profile (401) indicating the refractive index of the LC lens (301) versus the position can be relatively smooth. Referring to FIGS. 3-4, the refractive index of the LC lens (301) can vary with a radial distance r (e.g., an absolute value of the position) from the center of the first substrate (321). The refractive index can be controlled by the respective voltages of the electrodes (311)-(313). The refractive index can be circularly symmetric in the XZ plane.

Referring back to FIG. 3, a light beam (e.g., linearly polarized) can be incident onto the LC lens (301) along a direction indicated by arrows (331)-(333). The light beam can include a center portion (e.g., associated with the arrow (333)) that passes through the electrode (313) and peripheral portions (e.g., associated with the arrows (331)-(332)) that pass through the electrodes (311)-(312), respectively. Dashed lines associated with the arrows (331)-(333) can represent wavefronts of the center portion and the peripheral portions of the light beam, respectively. Due to the refractive index variation with the position shown in FIG. 4, wavefronts of the light beam within the LC lens (301) and wavefronts of the light beam exiting the LC lens (301) can be tilted as indicated by dashed lines within and outside the LC lens (301), respectively. Thus, a center portion and peripheral portions of the output light beam can be focused on a same focal point P with a focal length f, for example, measured as a distance between the focal point P and the first substrate (321). In an example, directions of the center portion and the peripheral portions of the output light beam are represented by arrows (343) and (341)-(342), respectively. The LC lens (301) can be equivalent to a lens (e.g., a convex lens) made from glass.

The profile (401) indicating the refractive index of the LC lens (301) can be aspheric, such as parabolic, in a cross section (e.g., an XY plane) through a principal axis (e.g., Y-axis) when the multiple voltages are applied as shown in FIG. 3. A phase and an optical path length (OPL) (or an optical path (OP)) of a light beam in a material can be proportional to the refractive index and a distance traveled in the material. A first phase and a first OP of the light beam in the LC lens (301) can be proportional to the refractive index and a distance d, and thus a first phase profile or a first OPL profile can have an identical shape as that of the profile (401), such as aspheric (e.g., parabolic) in the cross section (e.g., the XY plane) through the principal axis (e.g., Y-axis) when the multiple voltages are applied as shown in FIG. 3. d1 can be a distance between the electrodes (311)-(313) and the electrode (314). d1 can be a thickness of the LC lens (301) that does not include the first and the second substrates (321)-(322). A parabolic phase profile can perform better than a spherical profile when a light beam emitted by a point source is collimated by the LC lens (301) or a collimated light beam is focused by the LC lens (301). A first optical path difference (OPD), for example, between the first OP associated with a position on the first substrate (321) and a first reference OP associated with a reference position (e.g., at the edge on the first substrate (321)) can have a same shape as that of the profile (401) in FIG. 4 where the first OP and the first reference OP are in the LC lens (301). In an example, the first OPD between the first OP at the center position (e.g., 0 mm) and the first OP at the edge position is proportional to $(n_e-n_o)\times d$.

A second OPD between a second OP associated with a position on the first substrate (321) and a second reference OP associated with a reference position on the first substrate (321) has a parabolic shape where the second OP and the second reference OP are between the LC lens (301) and the focal point P. In an example, the second OPD is estimated using Eq. 1 where r indicates the radial distance.

$$\text{Second } OPD = \sqrt{r^2+f^2} - f \approx \frac{r^2}{2f} \tag{Eq. 1}$$

In an example, a total OP that is a sum of the first OP in the LC lens (301) and the second OP from the LC lens (301) to the focal point P is the same or similar for each position on the first substrate (321), and thus different portions of the light beam can be focused onto the same focal point P.

In an example, a theoretical limit of an optical power for the LC lens (301) (e.g., a GRIN lens) can be derived based on Eq. 2.

$$\text{Optical power} = 2\times\Delta n\times d/R^2 \tag{Eq. 2}$$

where R is a radius of the LC lens (301) that is used to converge or diverge light, the optical power (e.g., unit of diopter in m-1) can be an inverse of the focal length f, Δn is equal to $(n_e-n_o)$ indicating the birefringence of the LC materials. The radial distance r in Eq. 1 can be from 0 to R. In an example, the refractive index of the LC lens (301) at the edge (e.g., r=R) is $n_e$, the refractive index of the LC lens (301) at the center (e.g., r=0) is $n_o$. In an example, if a diameter (e.g., a diameter of a portion of the LC lens (301) that is used to converge or diverge light) of the LC lens (301) is 30 mm, Δn is 0.3, and d1 is 375 microns, the optical power is estimated from Eq. 2 as $2\times0.3\times375\times10^{-6}/(15\times10^{-3})^2=1$ D. By reversing voltages, the LC lens (301) can become a diverging lens having the same magnitude of diopter (e.g., −1D). By adjusting the multiple voltages, a continuous varifocal manipulation between the strongest positive optical power (e.g., +1D) and the strongest negative optical power (e.g., −1D) can be achieved.

In an example, the LC materials in the LC lens (301) include rodlike molecules exhibiting positive birefringence, $n_e$ is from 1.56 to 1.89, $n_o$ is from 1.47 to 1.55, Δn is from 0.05 to 0.45, d1 is from 5 to 400 microns, R is from 1 mm to 25 mm, and voltages are from 0 to 6 V. The electrodes (311)-(314) can be made from indium tin oxide (ITO). The first and second substrates can be made from glass, plastics, and/or any suitable material(s). In an example, the first and second substrates are glass substrates with a total thickness of 0.5 mm, and thus T1 can be from 0.5 mm to 0.8 mm. Additional material(s) (e.g., an alignment layer) may be used in the LC lens (301).

A width of each electrode (e.g., 311, 312, or 313) can be determined by a phase step within the respective electrode. In an example, the phase step is 1/10 λ for f of 400 mm and a design wavelength λ of 543.5 nm. In an example, the central electrode disk (e.g., 313) has a radius of about 200 μm, and the width of the outermost electrode (e.g., 311) is about 15 μm. In an example, a gap between two adjacent electrodes (e.g., 312 and 311) is 3 μm, and an LC cell has the thickness d1 of 10 μm.

The one or more cylindrical LC lenses (242) can be configured to correct for astigmatism. A cylindrical LC lens can include a plurality of transparent electrodes disposed on a first substrate and a transparent electrode disposed on a second substate. The first substrate and the second substrate can be parallel to the XZ plane. In an example, the cylindrical LC lens has a structure and materials similar or identical to those of the LC lens (301) shown in FIG. 3 and a refractive index or an OP profile similar to the profile (401) shown in FIG. 4.

For each cylindrical LC lens in the one or more cylindrical LC lenses (242), in an example, the LC materials in the cylindrical LC lens are similar or identical to those in the LC lens (301) and have similar or identical refractive indices. For example, the LC materials in the cylindrical LC lens include rodlike molecules exhibiting positive birefringence, $n_e$ is from 1.56 to 1.89, $n_o$ is from 1.47 to 1.55, Δn is from 0.05 to 0.45, d1 is from 5 to 400 microns, and voltages are from 0 to 6 V. The first and second substrates can be made from glass with a total thickness of 0.5 mm. T1 can be less than or equal to 1 mm, such as from 0.5 mm to 0.8 mm. The electrodes (311)-(314) can be made from indium tin oxide (ITO). The first and second substrates can be made from glass and/or any suitable material(s). In an example, the first and second substrates are glass substrates with a total thickness of 0.5 mm, and thus T1 can be from 0.5 mm to 0.8 mm. Additional material(s) (e.g., an alignment layer) may be used in the LC lens (301).

A difference between the LC lens (301) and the cylindrical LC lens is that the plurality of transparent electrodes of the cylindrical LC lens can be parallel, and the refractive index of the cylindrical LC lens that is electrically tunable can vary only along a dimension (e.g., the X axis) in the XZ plane. The plurality of transparent electrodes of the cylindrical LC lens can include rectangular electrodes parallel to each other. In an example, the plurality of transparent electrodes of the cylindrical LC lens are parallel to the Z axis in the XZ plane, the refractive index of the cylindrical LC lens varies only along the X axis, and does not vary along the Z axis. On the other hand, the refractive index of the LC lens (301) varies radially including, for example, along the X axis and the Z axis.

The cylindrical LC lens can converge or diverge light in only a first dimension (e.g., the X axis) and does not affect light in a second dimension (e.g., the Z axis) that is perpendicular to the first dimension. In an example, the first dimension and the second dimension are perpendicular to an axis (e.g., the Y axis) along which the light propagates. The cylindrical LC lens can have an optical power in only the first dimension. There are two types of cylindrical lenses, such as converging (or positive) cylindrical lenses and diverging (or negative) cylindrical lenses.

Advantages of the electrically tunable cylindrical LC lens can include achieving various prescriptions (e.g., indicated by the parameter Cylinder (CYL) and the parameter Axis) by programming and dynamically adjusting the voltage (e.g., including voltages of the plurality of transparent electrodes) applied to each cylindrical LC lens. For example, three cylindrical LC lenses (e.g., a first cylindrical LC lens, a second cylindrical LC lens, and a third cylindrical LC lens) are stacked at 0°, 45°, and 90° with respect to the X axis (e.g., rotating around Y-axis in FIG. 3). In an example, 0°, 45°, and 90° with respect to the X axis indicates respective orientations of the plurality of transparent electrodes in the three cylindrical LC lenses. For example, 0° with respect to the X axis indicates that the plurality of transparent electrodes of the first cylindrical LC lens is parallel to the X axis, 45° with respect to the X axis indicates that the plurality of transparent electrodes of the second cylindrical LC lens is 45° with respect to the X axis, and 90° with respect to the X axis indicates that the plurality of transparent electrodes of the third cylindrical LC lens is 90° with respect to the X axis. The first cylindrical LC lens, the second cylindrical LC lens, and the third cylindrical LC lens can be tuned individually by controlling the electrically tunable controller (281). As a wavefront corrector, the one or more cylindrical LC lenses (242) can be attached to the one or more LC lenses (241) to obtain a customized phase profile and therefore a corrected vision that is free from astigmatism for different users.

Figure 5A:
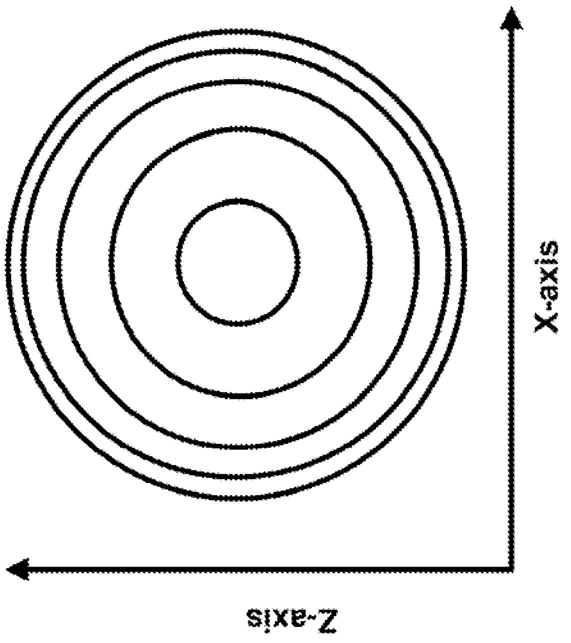
FIG. 5A shows an exemplary optical path difference (OPD) projection from three-dimension (3D) to an XZ plane, representing a corrected phase retardance from LC lenses corrected defocus according to an embodiment of the disclosure.
Figure 5B:
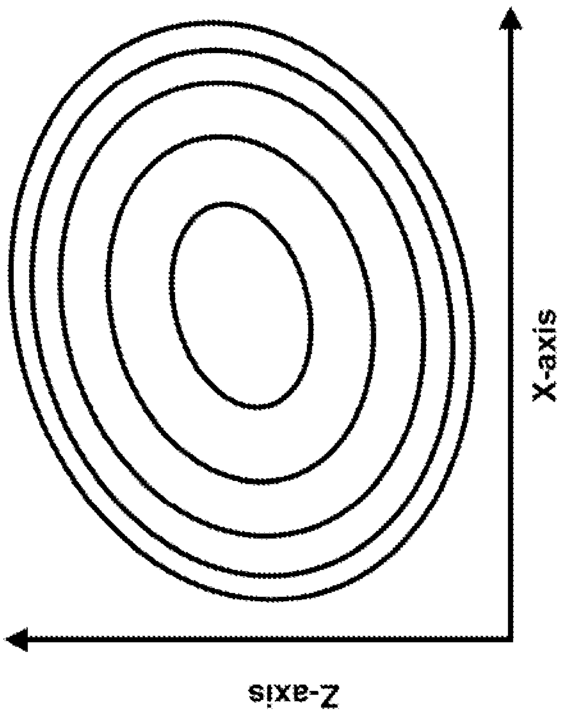
FIG. 5B shows an exemplary OPD projection from 3D to the XZ plane, representing a corrected phase retardance from the LC lenses corrected defocus and from cylindrical LC lenses corrected astigmatism according to an embodiment of the disclosure.

FIG. 5A shows an exemplary OPD projection from three-dimension (3D) to the XZ plane, representing a corrected phase retardance from LC lenses (e.g., the one or more LC lenses (241)) corrected defocus (the optical power compensation that changes a focal length). FIG. 5B shows an exemplary OPD projections from 3D to the XZ plane, representing a corrected phase retardance from the LC lenses (e.g., the one or more LC lenses (241)) corrected defocus and from cylindrical LC lenses (e.g., the one or more cylindrical LC lenses (242)) corrected astigmatism (a cylindrical power compensation with the desired axis). In an example, FIGS. 5A-5B show interference patterns, and a phase difference between two adjacent lines (e.g., circles in FIG. 5A or ovals in FIG. 5B) can be 2π.

A polarization state of a light beam can be altered as the light beam passes through certain optical elements. In an embodiment, a polarization state of a light beam can be altered by a waveplate or a retarder as the light beam travels through the waveplate. A quarter-wave plate (QWP) can alter a polarization state of a light beam traveling through the QWP by 90° or π/2. In an example, the QWP converts linearly polarized light into circularly polarized light or circularly polarized light into linearly polarized light. A phase profile (or a phase retardation) introduced by a waveplate can be given by $\Gamma = OPD \times 2\pi/\lambda$. A retarder (or a waveplate) is a QWP when $\Gamma=\pi/2$, and a retarder (or a waveplate) is a HWP when $\Gamma=\pi$.

Figures 6A, 6B:
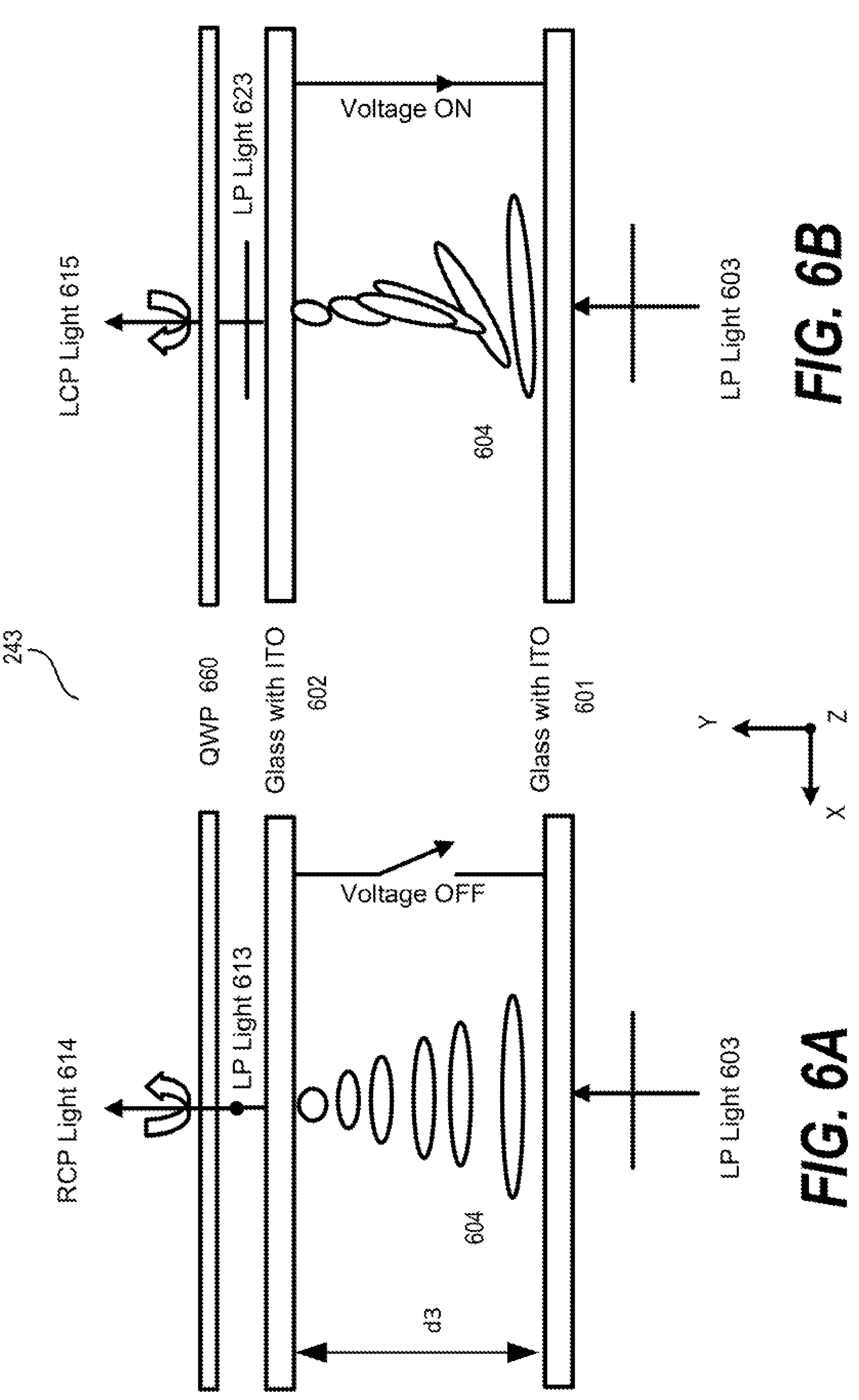
FIGS. 6A-6B show schematics of a working principle of an LC spatial light modulator (SLM) according to an embodiment of the disclosure.

FIGS. 6A-6B show schematics of a working principle of the LC SLM (243). In an example, the LC SLM (243) is made from twisted nematic (TN) LC materials (604) that have been arranged in a 90° twisted configuration, and is referred to as a TN SLM. The TN LC materials can be disposed between two electrodes (e.g., ITO) (601) and (602). Each electrode can be disposed on a respective transparent substrate (e.g., a glass substrate). In an example, an alignment material (e.g., polyimide) is disposed between the TN LC materials (604) and an electrode (e.g., (601)) to align the TN LC material (604).

The LC SLM (243) can be a TN LC polarization modulator as the LC SLM (243) can modulate a polarization state of light. Similar to an HWP, the TN LC SLM (243) can be used to rotate a plane of polarization of light. An advantage of using the LC SLM (243) includes that the LC SLM (243) can be easily controlled and switched on and off using an electric field. Therefore, the plane of polarization can be rapidly changed or switched, such as in displays or in optical switches. The LC SLM (243) can be a fast-switchable TN SLM.

FIG. 6A shows the schematics of a 90° TN SLM with a voltage being 'OFF' (e.g., 0V). FIG. 6B shows the schematics of the 90° TN SLM with the voltage being 'ON' (e.g., 6V). A linearly polarized light beam (603) that is polarized, for example, along the X axis is incident onto the LC SLM (243). Referring to FIG. 6A, when the voltage is "OFF", the TN LC materials can rotate 90° along the light path (e.g., along the Y axis) when no voltage is applied. The LC SLM (243) rotates the polarization of the light beam (603) 90° (e.g., from X axis to the Z axis), and thus an output light beam (613) is linearly polarized along the Z axis. Referring to FIG. 6B, when the voltage is "ON", the TN LC materials are oriented by an electrical field, for example, along the Y axis, and the LC SLM (243) does not change the polarization of the light beam (603). Thus, an output light beam (623) is linearly polarized along the X axis.

The output light beam (613) or (623) can subsequently go through a QWP (e.g., a broadband QWP that is applicable to different wavelengths covering a large wavelength range) to become a circularly polarized light, such as an RCP light beam (614) or an LCP light beam (615), respectively, before entering the PB phase lens (244).

In an example, the LC materials (604) in the LC SLM (243) include rodlike molecules exhibiting positive birefringence, $n_e$ is from 1.56 to 1.89, $n_o$ is from 1.47 to 1.55, Δn is from 0.05 to 0.45, and voltages are from 0 to 6 V. In an example, a thickness of the QWP (660) is 0.05 mm, a total thickness of the substrates is 0.5 mm, a thickness d3 of the TN LC layer can be from 5 to 15 microns, and thus a total thickness of the LC SLM (243) can be estimated to be less than 1 mm (e.g., from 0.555 mm to 0.57 mm).

Figure 7A:
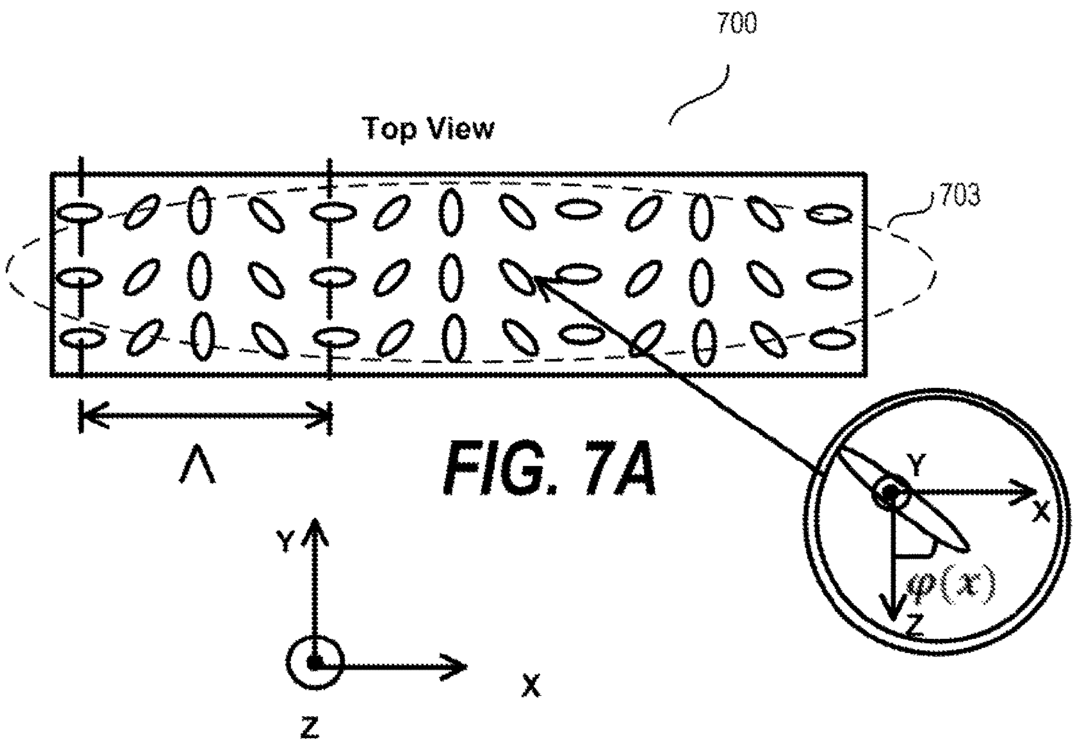
FIGS. 7A-7B show schematics of a Pancharatnam-Berry (PB) phase lens according to an embodiment of the disclosure.
Figure 7B:
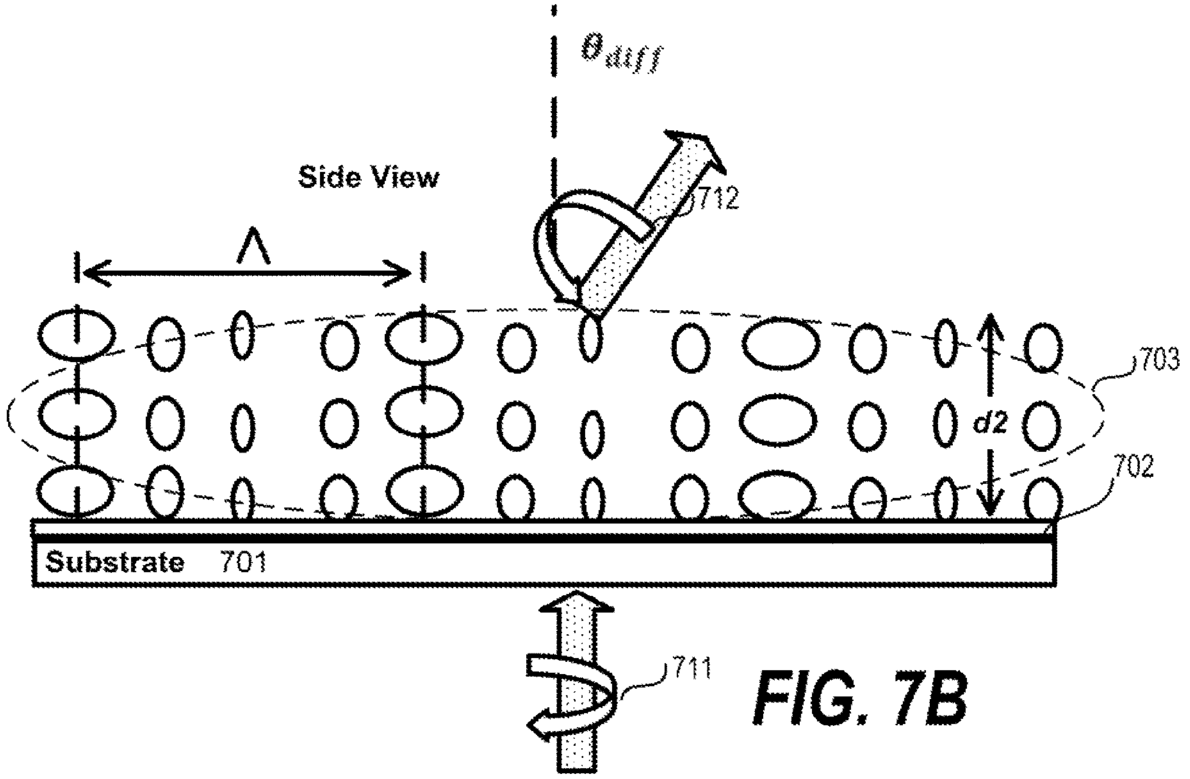

FIGS. 7A-7B show schematics of a PB phase device, such as the PB phase lens (244) according to an embodiment of the disclosure. A local region (e.g., a peripheral region) (700) of the PB phase lens (244), for example, near an edge of the PB phase lens (244) is illustrated in FIGS. 7A-7B.

A PB lens can also be referred to as a geometric phase lens or a volume holographic lens. In an example, the PB phase lens (244) is a passive LC lens, for example, not electrically tunable. The PB phase lens (244) can be polarization controlled as described above.

The PB phase lens (244) can be formed by spin-coating multiple layers of LC materials (e.g., LC monomers RM257 mixtures followed by UV exposure) to a photoalignment layer (702) (e.g., a photoalignment material such as brilliant yellow dye) which can have a Fresnel-type lens pattern exposed by using two circularly polarized interfering beams and to realize the functionality of imaging. The LC materials (e.g., the LC monomers) can become LC polymer (703), for example, after the UV exposure. A radius of the PB phase lens (244) can be from 2 mm to 30 mm, such as from 2.5 to 25 mm. The PB phase lens (244) can be designed as a DOE with a few micrometers in a uniform thickness d2 on a substrate (e.g., made from glass, plastic material(s), and/or other material(s)) (701) and can act as a HWP for specific wavelength(s) (e.g., wavelengths in a wavelength range, such as from 430 nm to 680 nm.

Input circularly polarized light (711) and output circularly polarized light (712) can be expressed using Jones Matrices below.

$$\begin{bmatrix} E_{z-in} \\ E_{x-in} \end{bmatrix} = \begin{bmatrix} 1 \\ \mp i \end{bmatrix}, \begin{bmatrix} E_{z-out} \\ E_{x-out} \end{bmatrix} = -ie^{-i(\mp 2\varphi(x))}\begin{bmatrix} 1 \\ \mp i \end{bmatrix} \quad \text{(Eq. 3)}$$

Referring to FIG. 7A, φ(x) can denote a fast axis orientation angle of a local LC director (e.g., a local average orientation of the liquid crystal molecules). A phase change of 2φ can occur while the handedness (e.g., LCP or RCP) of the circular polarization is inverted, such as (i) from LCP to RCP or (ii) from RCP to LCP. Thus, the PB phase lens (244) can be fabricated by patterning the LC molecular orientation as shown in FIGS. 7A-7B. In an example, φ(x) is a linear function of x, such as φ(x)=180° x/Λ. Λ can be referred to as a half-pitch. In an example, the LC orientation does not change along the Y axis.

The half-pitch Λ can be defined as a distance over which LC molecules are rotated by π radians about the Y axis. In an embodiment, the half-pitch Λ is relatively large (e.g., between 100 to 300 microns) at a center of the PB phase lens (244) and decreases toward edges of the PB phase lens (244). For example, the half-pitch A is less than 5 microns (e.g., 2 μm) at the edges. Thus, a local region of the PB phase lens (244) with a specific half-pitch Λ can function as a diffraction grating that can periodically modulate incident light. As described above, the PB phase lens (244) can include multiple diffraction gratings with different periodicities, such as different half-pitches Λ.

Referring to FIG. 7B, the local region (700) with the half-pitch A can deflect the incident wave of light (711) to a diffraction angle $\theta_{diff}$ that is determined by Eq. 4 where A represents a wavelength of light.

$$\sin(\theta_{diff}) = \lambda/\Lambda \quad \text{(Eq. 4)}$$

When the half-pitch Λ decreases with a radial distance from a center of the PB phase lens (244), the diffraction angle $\theta_{diff}$ can increase with the radial distance. In an example, the half-pitch A varies continuously, and thus a phase profile can vary continuously with the radial distance. Due to the continuous phase profile and a flat geometry, the PB phase lens (244) can provide a higher optical quality and less stray light in comparison to other types of lenses, such as Fresnel-type lenses.

In an example, a thickness of the substrate (e.g., a glass substrate) (701) is 0.25 mm, a thickness d2 is about 2 microns, and thus a total thickness of the PB phase lens (244) can be approximately 0.25 mm. In an example, a thickness of the photoalignment layer (702) is less than 100 nm (e.g., 20 nm).

Referring back to FIG. 2, when the components in the LC vision correction optical system (240) are stacked together, a total thickness of the LC vision correction optical system (240) can be approximately 0.8+(N1+N2)×0.8 (mm), where d1 is 0.3 mm and N1 and N2 are numbers of the LC lenses in the stack of LC lenses (241) and the cylindrical LC lenses in the stack of cylindrical LC lenses (242), respectively. If N1=N2=3, the total thickness of the LC vision correction optical system (240) is about 5.6 mm, and thus the LC vision correction optical system (240) can be considered as thin.

If d1 is 8 microns, the total thickness of the LC vision correction optical system (240) is about 0.8+(N1+N2)×0.5 (mm). If N1=N2=3, the total thickness of the LC vision correction optical system (240) is about 3.8 mm.

Figure 8A:
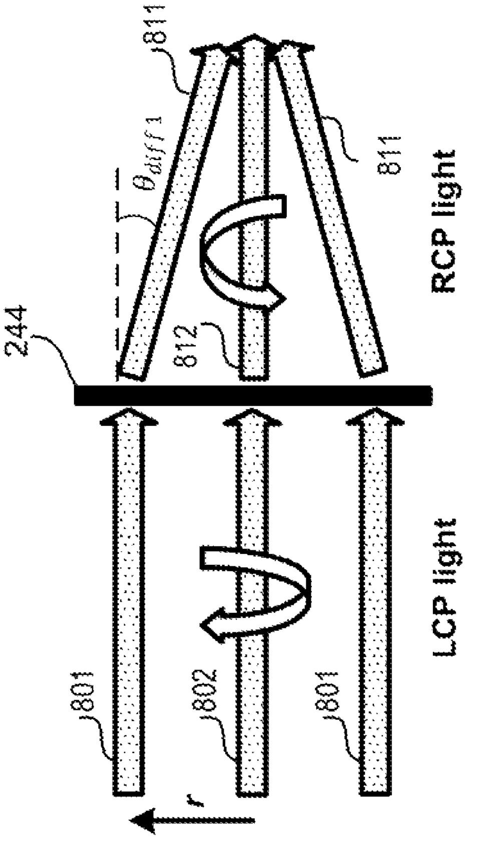
FIGS. 8A-8B show schematics of a working principal of the PB phase lens according to embodiments of the disclosure.
Figure 8B:
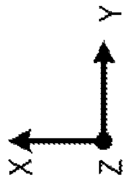
Figure 8B:
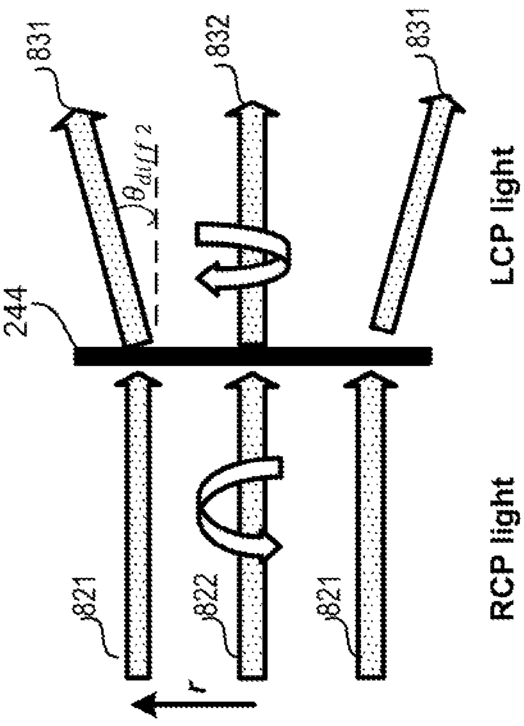

FIGS. 8A-8B show schematics of a working principal of the PB phase lens (244) according to embodiments of the disclosure. Referring to FIG. 8A, an input beam onto the PB phase lens (244) is LCP. The input light beam can include portions (801)-(802) that are incident onto a peripherical region and a center region of the PB phase lens (244), respectively. An output light beam diffracted by the PB phase lens (244) can include portions (811)-(812) that correspond to the portions (801)-(802), respectively. In the center region, the half-pitch A is large, and the portion (802) is diffracted with a diffraction angle $\theta_{diff}$ of 0° (or approximately 0°) with respect to an axis (e.g., the Y axis) that is perpendicular to the PB phase lens (244). Thus, the portion (812) is propagating along the axis (e.g., the Y axis) without bending.

In the peripheral region, the half-pitch Λ is small, and the portion (801) is diffracted with a diffraction angle $\theta_{diff1}$. Thus, the portion (811) is bent toward the axis (e.g., the Y axis).

For purposes of brevity, two regions (e.g., two diffraction gratings with two different half-pitches), such as a peripherical region and a center region of the PB phase lens (244), are shown in FIGS. 8A-8B. The PB phase lens (244) can include multiple diffraction gratings that can diffract the input light beam toward various diffraction angles that may change, for example, continuously with the radial distance r.

Referring to FIG. 8A, whether the PB phase lens (244) is a converging lens or a diverging lens can depend on a polarization state of the input light beam. In an example, when the input light beam is LCP, the output light beam is RCP. Further, the portion (811) can bend toward the axis, and the PB phase lens (244) is a converging lens with the second optical power being positive.

Referring to FIG. 8B, an input beam onto the PB phase lens (244) is RCP. The input light beam can include portions (821)-(822) that are incident onto the peripheral region and the center region of the PB phase lens (244), respectively. An output light beam diffracted by the PB phase lens (244) can include portions (831)-(832) that correspond to the portions (821)-(822), respectively. In the center region, the portion (822) is diffracted with a diffraction angle of 0° (or approximately 0°) with respect to the axis (e.g., the Y axis) that is perpendicular to the PB phase lens (244). Thus, the portion (832) can propagate along (or substantially along) the axis (e.g., the Y axis) without bending.

In the peripheral region, the portion (821) is diffracted with a diffraction angle $\theta_{diff2}$. Thus, the portion (831) is bent away from the axis (e.g., the Y axis).

Referring to FIG. 8B, when the input light beam is RCP, the output light beam is LCP. Further, the portion (831) can bend away from the axis, and the PB phase lens (244) is a diverging lens with the second optical power being negative.

As described above, FIGS. 8A-8B show exemplary optical paths going through the PB phase lens (244) with converging (FIG. 8A) and diverging (FIG. 8B) features by only changing the handedness of circular polarization of the input light beam. The PB phase lens (244) can be polarization controlled. In an example, the PB phase lens (244) only has two fixed powers in a positive side or a negative side by switching the handedness of the input light beam.

Adding the PB phase lens (244) to the LC vision correction optical system (240) can serve multiple purposes. A combination of the one or more LC lenses (241) and the PB phase lens (244) can achieve a varifocal function with a larger optical power range as shown in FIG. 9. In an example, the optical power of the PB phase lens (244) is +3D or −3D depending on a polarization state of incident light onto the PB phase lens (244). The one or more LC lenses (241) can have a tunable-focus or a tunable optical power from +3D to −3D, for example, by stacking three LC lenses. Each of the three LC lenses can have a tunable optical power from +1D to −1D. FIG. 9 shows examples of a total optical power of the one or more LC lenses (241) and the PB phase lens (244). In an example, the total optical power of the one or more LC lenses (241) and the PB phase lens (244) is a sum of the first optical power of the one or more LC lenses (241) and the optical power of the PB phase lens (244). The total optical power of the one or more LC lenses (241) and the PB phase lens (244) can be from −6D to +6D.

In some embodiments, in addition to correcting for the astigmatism indicated by the parameter Cylinder (CYL) and the parameter Axis, the one or more cylindrical LC lenses (242) can have an optical power (e.g., radially, for example, along the X axis and the Z axis) that can correct for the parameter "Sphere (SPH)". For example, the optical power of the LC vision correction optical system (240) can be a sum of the first optical power of the one or more LC lenses (241), the optical power of the one or more cylindrical LC lenses (242), and the optical power of the PB phase lens (244).

In addition to achieve an integer total optical power, such as +6D, +5D, or the like. A finer tuning of the total optical power can be achieved by tuning the multiple voltages applied to the one or more LC lenses (241). In an example, the first optical power is +1.5, and thus the total optical power can be +4.5 or −1.5. In an embodiment, a fractional step, such as a 0.5D step, that is less than 1D can be used to tune the first optical power of the one or more LC lenses (241), and thus tuning the total optical power with the fractional step.

The PB phase lens (244) can compensate for a chromatic aberration of the one or more LC lenses (241) (e.g., ROEs) and/or other ROEs in the optical system (110) or (110D) since the PB phase lens (244) is a DOE. The ROEs and the PB phase lens (244) (the DOE) can exhibit opposite chromatic aberrations as described above and shown in FIGS. 10A-10C.

Figures 10A, 10B, 10C, 10D:
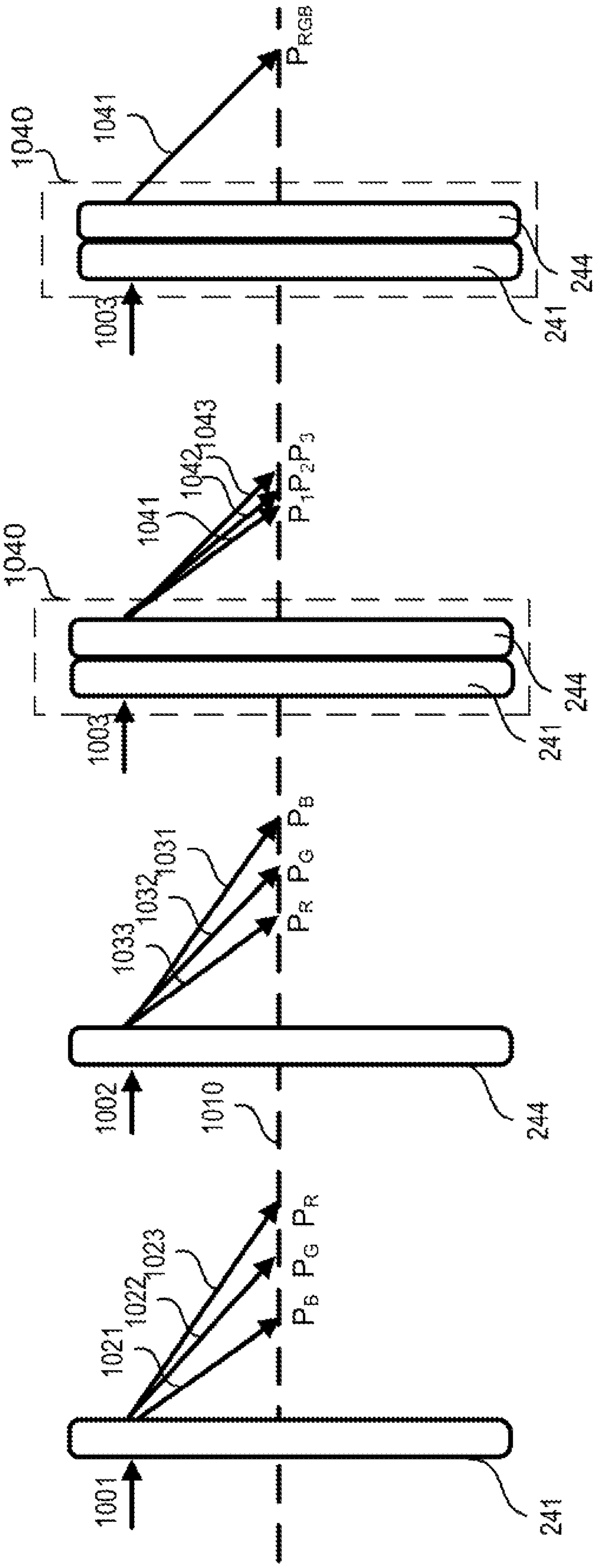
FIGS. 10A-10D show examples of chromatic aberrations of a refractive optical element (ROE), a diffractive optical element (DOE), and chromatic aberration correction and achromatic performance of the combined ROE and the DOE lenses.

FIGS. 10A-10D show examples of chromatic aberrations of an ROE, a DOE, and chromatic aberration correction and achromatic performance of the combined ROE and the DOE lenses. FIG. 10A shows a first type of chromatic aberration where a focal length of the one or more LC lenses (241) that are ROE(s) can increase with wavelength. An optical axis (1010) of the one or more LC lenses (241) can be perpendicular to the one or more LC lenses (241) and passes through the center of one or more LC lenses (241). When a light ray (1001) that is incident onto the one or more LC lenses (241) perpendicularly includes polychromatic wavelengths such as in the visible wavelengths (e.g., 380 to 780 nm), output rays corresponding to the polychromatic wavelengths can intersect with the optical axis (1010) at different points. The output rays include rays (1021)-(1023) corresponding to three different wavelengths $\lambda_B$, $\lambda_G$, and $\lambda_R$, and the rays (1021)-(1023) intersect with the optical axis (1010) at three different points $P_B$, $P_G$, and $P_R$, respectively. For purposes of brevity, only the rays (1021)-(1023) are illustrated in FIG. 10A. The three different points $P_B$, $P_G$, and $P_R$ can correspond to three different focal lengths $f_B$, $f_G$, and $f_R$, respectively. In an example, the light ray (1001) is white, and the three different wavelengths $\lambda_B$, $\lambda_G$, and $\lambda_R$ correspond to blue, green, and red.

FIG. 10B shows a second type of chromatic aberration where a focal length of the PB phase lens (244) that is a DOE can decrease with wavelength. An optical axis of the PB phase lens (244) can be perpendicular to the PB phase lens (244) and passes through the center of the PB phase lens (244). In an example, the optical axis of the PB phase lens (244) is the optical axis (1010). When a light ray (1002) that is incident onto the PB phase lens (244) perpendicularly includes polychromatic wavelengths such as in the visible wavelengths (e.g., 380 to 780 nm), output rays corresponding to the polychromatic wavelengths can intersect with the optical axis (1010) at different points. The output rays include rays (1031)-(1033) corresponding to the three different wavelengths $\lambda_B$, $\lambda_G$, and $\lambda_R$ that are described in FIG. 10A and the rays (1031)-(1033) intersect with the optical axis (1010) at three different points $P_B$, $P_G$, and $P_R$, respectively. For purposes of brevity, only the rays (1031)-(1033) are illustrated in FIG. 10B. The three different points $P_B$, $P_G$, and $P_R$ can correspond to three different focal lengths $f_B$, $f_G$, and $f_R$, respectively.

FIG. 10C shows an exemplary chromatic aberration compensation according to an embodiment of the disclosure. The PB phase lens (244) can be used together with the one or more LC lenses (241), such as shown in FIG. 2. An optical system (1040) can include the one or more LC lenses (241) and the PB phase lens (244). When a light ray (1003) that is incident onto the optical system (1040) includes polychromatic wavelengths such as in the visible wavelengths (e.g., 380 to 780 nm), output rays corresponding to the polychromatic wavelengths can intersect with the optical axis (1010) at different points. The output rays include rays (1041)-(1043) corresponding to the three different wavelengths $\lambda_B$, $\lambda_G$, and $\lambda_R$ that are described in FIG. 10A and the rays (1041)-(1043) intersect with the optical axis (1010) at three different points $P_1$, $P_2$, and $P_3$, respectively. For purposes of brevity, only the rays (1041)-(1043) are illustrated in FIG. 10C. The three different points $P_1$, $P_2$, and $P_3$ can correspond to three different focal lengths $f_B$, $f_G$, and $f_R$, respectively. Comparing FIG. 10C with FIGS. 10A-10B, the chromatic aberration compensation (or correction) by the PB phase lens (244) in FIG. 10C can reduce a spread of the points $P_1$, $P_2$, and $P_3$ along the optical axis (1010), and thus reduce an absolute difference of ($f_B - f_R$). When the chromatic aberration of the PB phase lens (244) does not cancel the chromatic aberration of the one or more LC lenses (241), a chromatic aberration of the optical system (1040) is at least less than the chromatic aberration of the one or more LC lenses (241).

FIG. 10D shows an exemplary cancellation of the chromatic aberration according to an embodiment of the disclosure. FIGS. 10C-10D are similar except that the chromatic aberration of the one or more LC lenses (241) is cancelled (e.g., is completely compensated) by the chromatic aberration of the PB phase lens (244). Achromatic performance can occur, for example, when the one or more LC lenses (241) and the PB phase lens (244) have comparable powers in a vision correction system. The output rays (including (1041)-(1043)) can become a single ray, such as the ray (1041). The ray (1041) can intersect with the optical axis (1010) at a same point $P_{RGB}$ that corresponds to the three different wavelengths $\lambda_B$, $\lambda_G$, and $\lambda_R$. The point $P_{RGB}$ can correspond to a single focal lengths $f_{RGB}$.

Chromatic aberration can depend on a focal length (e.g., an absolute value of the focal length) of a lens. In an example, when the absolute value of the focal length decreases, the lens is more diverging or more converging, and the chromatic aberration increases. In an example, the absolute value of the focal length of the PB phase lens (244) is fixed with the optical power of the PB phase lens (244) being +3D or −3D, and thus the aberration of the PB phase lens (244) can be fixed. The focal length of the one or more LC lenses (241) can vary, such as having the first optical power at 0, +/−1D, +/−2D, or +/−3D, and the chromatic aberration of the one or more LC lenses (241) can change with the first optical power. Referring to FIG. 10D, when the first optical power of the one or more LC lenses (241) is at a first value (e.g., 3D), the chromatic aberration of the one or more LC lenses (241) is cancelled (e.g., is completely compensated) by the PB phase lens (244). Thus, referring to FIG. 10C, when the first optical power of the one or more LC lenses (241) is at a value that is different from the first value (e.g., 3D), the chromatic aberration of the one or more LC lenses (241) is not cancelled (e.g., is completely compensated), but is reduced by the PB phase lens (244).

As described above, the one or more cylindrical LC lenses (242) can have the third chromatic aberration. FIGS. 10A-10D can be suitably adapted to include the third chromatic aberration of the one or more cylindrical LC lenses (242).

Figure 11:
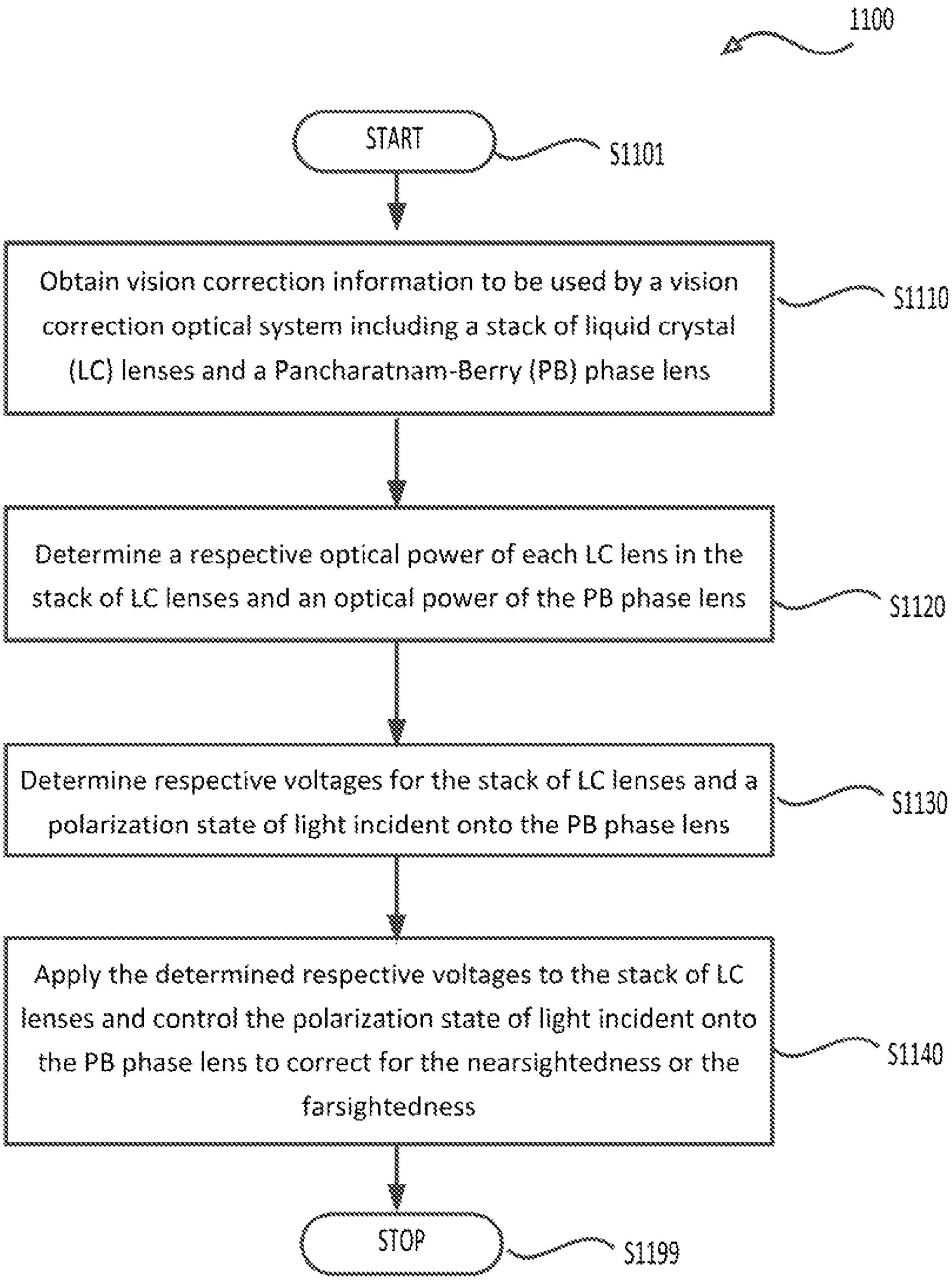
FIG. 11 shows a flow chart outlining a process according to some embodiment of the disclosure.

FIG. 11 shows a flow chart outlining a process (e.g., a vision correction process) (1100) according to some embodiment of the disclosure. In an example, a display system or an HMD system, such as the display system (100) or (100D) includes a vision correction optical system (e.g., the LC vision correction optical system (240)) and a viewing optical system (e.g., the viewing optical system (130) or (130D)), such as described above. The viewing optical system can be configured to direct light beams from a display device or a real object to an eye of a user of the display system, such as described in FIGS. 1A-1D.

In various examples, multiple users can use the display system. In an example, a user with changing eye prescription information can use the display system. Thus, the display system is to be adapted to different eye conditions corresponding to different eye prescription information. In an embodiment, before a user uses the display system, the vision correction process (1100) can be implemented to tune (e.g., electrically and optionally via controlling a polarization) the vision correction optical system based at least on an eye condition of the user. The vision correction process (1100) can correct for nearsightedness/farsightedness, astigmatism, chromatic aberration, additional aberration(s), and/or the like. The vision correction optical system can be configured to correct for nearsightedness or farsightedness, astigmatism, chromatic aberration, and/or the like. The vision correction optical system can include a stack of LC lenses (e.g., (241)) and a PB phase lens (e.g., (244)). In an example, the vision correction process is executed by processing circuitry, such as processing circuitry in the controller (180). The process (1100) starts at step (S1101) and proceeds to step (S1110).

At step (S1110), vision correction information (or eye prescription information) to be used by the vision correction optical system can be obtained. The vision correction information can include information indicated by one or more of the parameter Sphere (SPH), the parameter Cylinder (CYL), and the parameter Axis, as described above. The parameter Sphere (SPH) can indicate nearsightedness or farsightedness. The parameter Cylinder (CYL) and the parameter Axis can indicate astigmatism. The vision correction information can be eye prescription information of the user.

At step (S1120), a respective optical power of each LC lens in the stack of LC lenses and an optical power of the PB phase lens can be determined, for example, based on a look-up table, such as shown in FIG. 9. For example, if the parameter Sphere (SPH) indicates a nearsightedness of −2D. The optical power of the stack of LC lenses is +1D, and the optical power of the PB phase lens is-3D. If the stack of LC lenses includes 3 LC lenses, any suitable optical powers can be assigned to the 3 LC lenses if the sum of the optical powers of the 3 LC lenses is +1D. In an example, each LC lens has an optical power of +⅓D.

At step (S1130), respective voltages for the stack of LC lenses and a polarization state of light incident onto the PB phase lens can be determined. The polarization state of light incident onto the PB phase lens can be determined based on the optical power of the PB phase lens, such as described in FIGS. 8A-8B. Referring to FIG. 8B, since the optical power of the PB phase lens is negative, the polarization state of light incident onto the PB phase lens is determined to be RCP. The respective voltages for the stack of LC lenses can be determined based on the respective optical powers of the LC lenses, such as described in FIGS. 3-4.

At step (S1140), the determined respective voltages can be applied to the stack of LC lenses and the polarization state of light incident onto the PB phase lens can be manipulated, for example, to correct for the nearsightedness or the farsightedness. In an example, the polarization state of light incident onto the PB phase lens can be manipulated by electrically controlling an SLM, such as the LC SLM (243) as described in FIG. 2.

Then, the process (1100) proceeds to step (S1199) and terminates.

The process (1100) can be suitably adapted to various scenarios and steps in the process (1100) can be adjusted accordingly. One or more of the steps in the process (1100) can be adapted, omitted, repeated, and/or combined. Any suitable order can be used to implement the process (1100). Additional step(s) can be added.

In an embodiment, the vision correction process described above can be executed iteratively. For example, after step (S1140) is implemented, if the user cannot see clearly the real object or what the display device displays, the process (1100) can go back to step (S1110), and can adjust the vision correction information to obtain updated vision correction information. Steps (S1120), (S1130), and (S1140) can be implemented. Thus, the process (1100) can be implemented iteratively, for example, until certain criteria is satisfied. The certain criteria may include (i) the user can see clearly the real object or what the display device displays, (ii) a number of iterations reaches a threshold, and/or the like. In an example, at least one of the respective voltages applied to the stack of LC lenses can be adjusted incrementally.

At step (S1110), the vision correction information may include default values (or initialization values) for the parameters, for example, if no specific vision correction information is available for the user.

In an example, astigmatism is corrected by determining a respective optical power (e.g., along a single dimension associated with the respective cylindrical lens) and a respective axis of each cylindrical LC lens in the stack of cylindrical LC lenses. Respective voltages for the stack of cylindrical LC lenses are determined based on the optical power and the axes of the respective cylindrical LC lenses. The determined respective voltages are applied to the stack of cylindrical LC lenses to correct for the astigmatism.

In an example, when the stack of cylindrical LC lenses is used in the vision correction optical system, steps (S1120), (S1130), and (S1140) can be modified as the stack of cylindrical LC lenses can affect the optical power (radially along multiple dimensions) of the vision correction optical system. For example, if the parameter Sphere (SPH) indicates the nearsightedness of −2D, the optical power of the PB phase lens is −3D, and the stack of cylindrical LC lenses that corrects for the astigmatism has the optical power (radially along multiple dimensions) of +0.5D. The optical power of the stack of LC lenses can be determined to be +0.5D.

The display system (100) can include other suitable mechanical, electrical and optical components. For example, referring to FIG. 1C, the display system (100) includes a frame (101), or housing, that can protect other components of the display system (100). In another example, the display system (100) can include a strap (not shown) to fit the display system (100) on a head of the user. In another example, the display system (100) can include communication components (not shown, e.g., communication software and hardware) to wirelessly communicate with a network, a host device, and/or other device. In some examples, the display system (100) can include a light combiner that can combine the virtual content and see-through real environment.

Embodiments in the disclosure may be used separately or combined in any order.

A computer or computer-readable medium can control various aspects of an HMD system in which the display system (100) including the optical system (110) is incorporated. Various aspects of the display system (100) including implementing the vision correction process and/or controlling the vision correction via the electrically tunable controller (281) can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
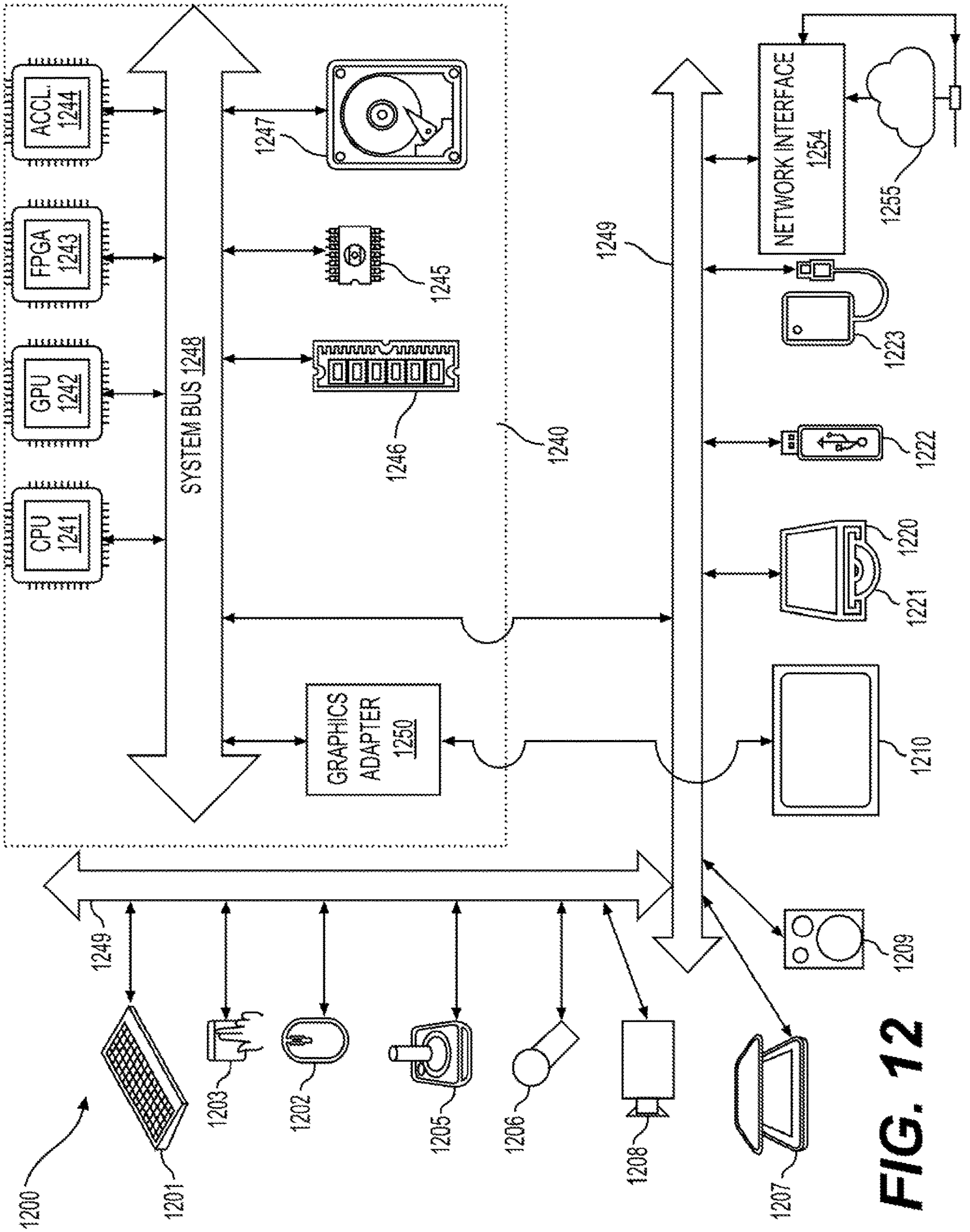
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch-screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as touch-screens (1210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (1255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators (1244) for certain tasks, graphics adapters (1250), and so forth. These devices, along with Read-only memory (ROM) (1245), Random-access memory (1246), internal mass storage (1247) such as internal non-user accessible hard drives, SSDs, and the like, may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the touch-screen (1210) can be connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (1200) having architecture, and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An optical system, comprising:

an electrically tunable lens system including one or more liquid crystal (LC) lenses that are refractive optical elements, the one or more LC lenses having a first chromatic aberration, a Pancharatnam-Berry (PB) phase lens that is a diffractive optical element, the PB phase lens having a second chromatic aberration that is complementary to the first chromatic aberration, and a LC spatial light modulator (SLM) disposed between the electrically tunable lens system and the PB phase lens, wherein a chromatic aberration of the optical system is less than the first chromatic aberration, when a light beam from the electrically tunable lens system and incident on the LC SLM is linearly polarized, the LC SLM is configured to convert the linearly polarized light beam into a first circularly polarized light beam that is output from the LC SLM, and the PB phase lens is configured to convert the first circularly polarized light beam incident on the PB phase lens into a second circularly polarized light beam that is output from the PB phase lens, and the first circularly polarized light beam and the second circularly polarized light beam are (i) left circularly polarized and right circularly polarized, respectively, or (ii) right circularly polarized and left circularly polarized, respectively.

2. The optical system according to claim 1, wherein a first optical power of the one or more LC lenses is electrically tunable, an optical power of the optical system is based at least on a sum of the first optical power of the one or more LC lenses and a second optical power of the PB phase lens, and the first optical power, the second optical power, and the optical power of the optical system correspond to respective focal lengths of the one or more LC lenses, the PB phase lens, and the optical system.

3. The optical system according to claim 2, wherein the one or more LC lenses include a plurality of LC lenses, each of the plurality of LC lenses is electrically tunable, and the first optical power is a sum of respective optical powers of the plurality of LC lenses.

4. The optical system according to claim 3, wherein a number of the plurality of LC lenses is 3.

5. The optical system according to claim 2, wherein one of the one or more LC lenses includes a plurality of transparent ring electrodes disposed on a first substrate and a transparent electrode disposed on a second substrate, the first substrate and the second substrate being parallel to a plane, and a refractive index of the one of the one or more LC lenses varies with a radial distance from a center of the plurality of transparent ring electrodes on the first substrate, the refractive index being controlled by respective voltages of the plurality of transparent ring electrodes, the refractive index and the first optical power being circularly symmetric in the plane.

6. The optical system according to claim 2, wherein the PB phase lens includes a center grating and a plurality of ring gratings formed by a liquid crystal material over a substrate, each of the plurality of ring gratings surrounds the center grating, the PB phase lens is configured to generate an output light beam from an input light beam that is incident on the substrate perpendicularly, the input light beam being the first circularly polarized light beam, the output light beam being the second circularly polarized light beam, a center diffracted portion of the output light beam has first diffraction angle θ1, the center diffracted portion corresponding to a center portion of the input light beam that is incident on the center grating, and peripheral diffracted portions of the output light beam have diffraction angles varying from the first diffraction angle 01 to a second diffraction angle θ2 corresponding to an outermost ring grating in the plurality of ring gratings, the peripherical diffracted portions corresponding to peripheral portions of the input light beam that are incident on the plurality of ring gratings, respectively, the second diffraction angle θ2 being greater than the first diffraction angleθ1.

7. The optical system according to claim 6, wherein the input light beam is left circularly polarized, the output light beam is right circularly polarized, and the PB phase lens functions as a converging lens with the second optical power being positive.

8. The optical system according to claim 6, wherein the input light beam is right circularly polarized, the output light beam is left circularly polarized, and the PB phase lens functions as a diverging lens with the second optical power being negative.

9. The optical system according to claim 6, wherein the optical system includes one or more cylindrical LC lenses configured to correct for astigmatism of an eye of a user using the optical system, and for each of the one or more cylindrical LC lenses, the respective cylindrical LC lens includes a plurality of transparent electrodes disposed on a first substrate and a transparent electrode disposed on a second substrate, the first substrate and the second substrate being parallel to an XZ plane including an X axis and a Z axis that are perpendicular to each other, the plurality of transparent electrodes being parallel, and a refractive index that is electrically tunable varies along a respective first dimension in the XZ plane.

10. The optical system according to claim 9, wherein the one or more cylindrical LC lenses include a first cylindrical LC lens, a second cylindrical LC lens, and a third cylindrical LC lens with the first dimensions forming 0, 45°, and 90° with the X axis, respectively.

11. The optical system according to claim 9, wherein the LC SLM is configured to convert the linearly polarized light beam to the LC SLM into the first circularly polarized light beam from the LC SLM by varying a voltage input to the LC SLM, the LC SLM being electrically tunable.

12. The optical system according to claim 11, wherein the one or more LC lenses include a stack of LC lenses that are electrically tunable, the one or more cylindrical LC lenses include a stack of cylindrical LC lenses with the first dimensions forming different angles with the X axis, respectively, the stack of cylindrical LC lenses being electrically tunable, and the electrically tunable lens system includes the stack of cylindrical LC lenses.

13. The optical system according to claim 12, wherein an input light beam that is incident on the electrically tunable lens system is linearly polarized, in response to the voltage of the LC SLM being a first voltage, the LC SLM is configured to convert the linearly polarized light beam that is incident on the LC SLM to the left circularly polarized light beam from the LC SLM, and the PB phase lens is configured to convert the left circularly polarized light beam to the PB phase lens into the right circularly polarized light beam from the PB phase lens, and in response to the voltage of the LC SLM being a second voltage, the LC SLM is configured to convert the linearly polarized light beam that is incident on the LC SLM into the right circularly polarized light beam from the LC SLM, and the PB phase lens is configured to convert the right circularly polarized light beam that is incident on the PB phase lens into the left circularly polarized light beam from the PB phase lens.

14. A head mounted display (HMD) system, comprising:

a display device, a pixel array in the display device being configured to generate light beams; and an optical system including:

an electrically tunable lens system including one or more liquid crystal (LC) lenses that are refractive optical elements, the one or more LC lenses having a first chromatic aberration, a Pancharatnam-Berry (PB) phase lens that is a diffractive optical element, the PB phase lens having a second chromatic aberration that is complementary to the first chromatic aberration, and a LC spatial light modulator (SLM) disposed between the electrically tunable lens system and the PB phase lens, wherein a chromatic aberration of the optical system is less than the first chromatic aberration, when a light beam from the electrically tunable lens system and incident on the LC SLM is linearly polarized, the LC SLM is configured to convert the linearly polarized light beam into a first circularly polarized light beam that is output from the LC SLM, and the PB phase lens is configured to convert the first circularly polarized light beam on the PB phase lens into a second circularly polarized light beam that is output from the PB phase lens, and the first circularly polarized light beam and the second circularly polarized light beam are (i) left circularly polarized and right circularly polarized, respectively, or (ii) right circularly polarized and left circularly polarized, respectively.

15. The HMD system according to claim 14, further comprising:

a virtual reality (VR) viewing optical system disposed between the display device and the optical system.

16. The HMD system according to claim 15, wherein the one or more LC lenses include a stack of LC lenses that are electrically tunable, and the optical system includes a stack of cylindrical LC lenses with first dimensions forming different angles with an X axis, respectively, the stack of cylindrical LC lenses being electrically tunable, the electrically tunable lens system including the stack of cylindrical LC lenses.

17. The HMD system according to claim 14, further comprising:

an augmented reality (AR) viewing optical system disposed between the display device and the optical system, the AR viewing optical system directing the light beams from the display device and light beams from a real object to the optical system.

18. A method of tuning an optical system, comprising:

obtaining vision correction information for at least one of nearsightedness or farsightedness;

determining a respective optical power of each liquid crystal (LC) lens in a stack of LC lenses in an electrically tunable lens system and an optical power of a Pancharatnam-Berry (PB) phase lens based on the vision correction information;

determining respective voltages to be applied to the stack of LC lenses based on the respective optical powers of the LC lenses;

determining a polarization state of light incident on the PB phase lens based on the optical power of the PB phase lens;

applying the determined respective voltages to the stack of LC lenses and controlling the polarization state of light incident on the PB phase lens to correct for the at least one of the nearsightedness or the farsightedness, wherein the optical system includes the electrically tunable lens system including the stack of LC lenses that has a first chromatic aberration, the PB phase lens that has a second chromatic aberration complementary to the first chromatic aberration, and a LC spatial light modulator (SLM) disposed between the electrically tunable lens system and the PB phase lens, a chromatic aberration of the optical system is less than the first chromatic aberration, when a light beam from the electrically tunable lens system and incident on the LC SLM is linearly polarized, the LC SLM is configured to convert the linearly polarized light beam into a first circularly polarized light beam that is output from the LC SLM, and the PB phase lens is configured to convert the first circularly polarized light beam on the PB phase lens into a second circularly polarized light beam that is output from the PB phase lens, the polarization state of light incident on the PB phase lens being the polarization state of the first circularly polarized light beam, and the first circularly polarized light beam and the second circularly polarized light beam are (i) left circularly polarized and right circularly polarized, respectively, or (ii) right circularly polarized and left circularly polarized, respectively.

19. The method of tuning the optical system according to claim 18, further comprising:

adjusting at least one of the respective voltages applied to the stack of LC lenses incrementally.

* * * * *